US012750099B2

(12) United States Patent
Kwon et al.

(10) Patent No.: US 12,750,099 B2
(45) Date of Patent: Sep. 29, 2026

(54) METHOD AND APPARATUS OF MULTI-USER SELECTION FOR MULTI-USER MIMO

(71) Applicant: Senscomm Semiconductor Co., Ltd., Suzhou (CN)

(72) Inventors: Kyung Hoon Kwon, Seoul (KR); Seung Hyeok Ahn, Laguna Hills, CA (US); Young Hwan Kang, Suzhou (CN); Seung Ho Choo, Suzhou (CN); Jungchul Shin, Suzhou (CN); Daehong Kim, Laguna Hills, CA (US)

(73) Assignee: Senscomm Semiconductor Co., Ltd., Suzhou (CN)

( * ) Notice: Subject to any disclaimer, the term of this patent is extended or adjusted under 35 U.S.C. 154(b) by 291 days.

(21) Appl. No.: 18/527,115

(22) Filed: Dec. 1, 2023

(65) Prior Publication Data

US 2024/0380446 A1 Nov. 14, 2024

Related U.S. Application Data

(60) Provisional application No. 63/584,147, filed on Sep. 20, 2023, provisional application No. 63/501,113, filed on May 9, 2023.

(30) Foreign Application Priority Data

Nov. 22, 2023 (CN) ......................... 202311566232.9

(51) Int. Cl.
*H04B 7/0452* (2017.01)
*H04L 1/00* (2006.01)

(52) U.S. Cl.
CPC ......... *H04B 7/0452* (2013.01); *H04L 1/0003* (2013.01); *H04L 1/0009* (2013.01)

(58) Field of Classification Search
CPC .... H04L 1/0009; H04L 1/0003; H04B 7/0452
See application file for complete search history.

(56) References Cited

U.S. PATENT DOCUMENTS

2017/0064566 A1* 3/2017 Elsherif ............... H04B 7/0452
2019/0341975 A1* 11/2019 Yun ...................... H04B 7/0452
2024/0080690 A1* 3/2024 Yang ....................... H04L 1/206
2024/0405829 A1* 12/2024 Oteri .................... H04B 7/0632

* cited by examiner

*Primary Examiner* — Donald L Mills
(74) *Attorney, Agent, or Firm* — BROADVIEW IP LAW, PC

(57) ABSTRACT

A wireless communication device for facilitating wireless communication is provided. The device transmits a training frame, and receives a plurality of feedback frames including channel quality information from a plurality of stations in response to the training frame. The device determines a plurality of groups based on the channel quality information in the plurality of feedback frames. Each of the plurality of groups is associated with a respective one of the plurality of stations and includes an associated station as a primary station and at least one secondary station. The device determines channel capacities of the plurality of groups and selects a group of the plurality of groups based on the channel capacities of the plurality of groups. The device determines users of the selected group as MU-MIMO users and transmits a MU PPDU in MU-MIMO for the users of the selected group.

16 Claims, 16 Drawing Sheets

FIG. 11

SNR inference matrix

| | | | | |
|---|---|---|---|---|
| | $SNR_{eff,u_0u_1}$ | $SNR_{eff,u_0u_2}$ | $SNR_{eff,u_0u_3}$ | $SNR_{eff,u_0u_4}$ |
| $SNR_{eff,u_1u_0}$ | | $SNR_{eff,u_1u_2}$ | $SNR_{eff,u_1u_3}$ | $SNR_{eff,u_1u_4}$ |
| $SNR_{eff,u_2u_0}$ | $SNR_{eff,u_2u_1}$ | | $SNR_{eff,u_2u_3}$ | $SNR_{eff,u_2u_4}$ |
| $SNR_{eff,u_3u_0}$ | $SNR_{eff,u_3u_1}$ | $SNR_{eff,u_3u_2}$ | | $SNR_{eff,u_3u_4}$ |
| $SNR_{eff,u_4u_0}$ | $SNR_{eff,u_4u_1}$ | $SNR_{eff,u_4u_2}$ | $SNR_{eff,u_4u_3}$ | |

FIG. 12

MCS inference matrix

| | | | | |
|---|---|---|---|---|
| | $MCS_{u_0u_1}$ | $MCS_{u_0u_2}$ | $MCS_{u_0u_3}$ | $MCS_{u_0u_4}$ |
| $MCS_{u_1u_0}$ | | $MCS_{u_1u_2}$ | $MCS_{u_1u_3}$ | $MCS_{u_1u_4}$ |
| $MCS_{u_2u_0}$ | $MCS_{u_2u_1}$ | | $MCS_{u_2u_3}$ | $MCS_{u_2u_4}$ |
| $MCS_{u_3u_0}$ | $MCS_{u_3u_1}$ | $MCS_{u_3u_2}$ | | $MCS_{u_3u_4}$ |
| $MCS_{u_4u_0}$ | $MCS_{u_4u_1}$ | $MCS_{u_4u_2}$ | $MCS_{u_4u_3}$ | |

METHOD AND APPARATUS OF MULTI-USER SELECTION FOR MULTI-USER MIMO

CROSS REFERENCE TO RELATED APPLICATION

This application claims benefit of U.S. Provisional Application No. 63/584,147, filed on Sep. 20, 2023, and U.S. Provisional Application No. 63/501,113, filed on May 9, 2023, in the United States Patent and Trademark Office, and China Patent Application No. 2023115662329, filed on Nov. 22, 2023, in the China National Intellectual Property Administration, the entire contents of which are hereby incorporated by reference.

TECHNICAL FIELD

The disclosure relates to wireless communication systems, and more particularly to, for example, but not limited to, an efficient user selection method and apparatus for multiple user multiple-input multiple-output (MU-MIMO) transmission.

BACKGROUND

Wi-Fi is a wireless local area network (WLAN) technology in frequency bands such as 2.4 GHz, 5 GHZ, and 6 GHz. As the spread of WLAN became active and applications using it diversified, IEEE 802.11ac, a WLAN system that supports Very High Throughput (VHT), was established. IEEE 802.11ac supports data processing speed of 1 Gbps or more through bandwidth (BW) transmission at up to 160 MHz, and it operates mainly in the 5 GHz band.

The IEEE 802.11ax standard, called High Efficiency WLAN (HE) was established to support higher throughput rates than IEEE 802.11ac supports. The main scenario considered in IEEE 802.11ax is a dense environment with many access point (AP) stations (STAs) and non-AP STAs. The IEEE 802.11ax standard has been intensively developed from the perspective of improving spectrum efficiency and area throughput.

Due to MIMO technology capable of multi-stream transmission, the downlink (DL) MU-MIMO technology has been introduced for multiple users using beamforming (BF) technology since IEEE 802.11ac. In addition, IEEE 802.11ax also enables MU-MIMO transmission in uplink (UL). In order to enable DL MU-MIMO transmission, the AP STA may first collect channel information of each non-AP STA through channel sounding. The collected channel information may include the average SINR for each stream, delta SINR for each subcarrier, and V-matrix, a compressed beamforming matrix per subcarrier, within the Compressed Beamforming Feedback and MU Exclusive Beamforming Report fields. The AP STA may generate a steering matrix Q from this information and multiplies it with the data stream to perform DL MU-MIMO transmission.

One of the most important things to be considered for MU transmission is how to group STAs participating in MU transmission among all STAs in a Basic Service Set (BSS). Assuming the number of AP transmitted antenna is $N_t$ and the total number of non-AP STAs with a single antenna in the BSS is $N_r$, $N_t$ non-AP STAs with the highest system capacity among all $N_r$ STAs are selected and communicated to maximize the capacity of the zero-forcing (ZF) beamformed MU-MIMO system in the $N_r > N_t$ environment. In this scenario, the user group that maximizes the system capacity is selected by comparing the $$\sum_{i=1}^{N_t}(N_r C_i)$$

times for all users. However, as the total number of users increases, the comparison target increases non-linearly, so it is difficult to apply to the real system.

To solve the problem of such an exhaustive searching algorithm, various sub-optimal searching algorithms have been introduced. One of the various sub-optimal searching algorithms is a method of calculating the correlation between channels through CSI feedback information and user grouping the combination of STAs with the lowest channel correlation between each other. In a WLAN system, the channel correlation can be calculated using V-matrix, a compressed beamforming matrix delivered to the AP STA via channel sounding. When M non-AP STAs with the lowest channel correlation are selected, the selected non-AP STAs may be required to determine the MCS that can succeed in decoding the received signal. This MCS selection predicts SNR and PER performance through the average stream SINR value and delta SNR among the feedback information transmitted to the AP. The AP STA selects the MCS level that may not cause packet errors based on the PER performance in the interference channel. This is called the Packet Error Rate (PER)-based rate adaptation technique.

This user selection technique has an advantage in terms of computational volume because the number of comparisons is reduced compared to Exhaustive searching algorithm. However, when combined with conventional PER-based rate adaptation techniques, the effect of inter-user interference cannot be accurately reflected, and it can lead to packet errors or group thrashing phenomena. That is, PER-based user selection has a problem of poor accuracy in terms of performance analysis and system throughput.

The description set forth in the background section should not be assumed to be prior art merely because it is set forth in the background section. The background section may describe aspects or embodiments of the present disclosure.

SUMMARY

Embodiments may provide the electronic devices to facilitate wireless communication. More particularly, embodiments may provide an efficient user selection method and apparatus in the WLAN wireless network standard that supports multiple user multiple-input multiple-output (MU-MIMO) in a WLAN system. For downlink (DL) MU-MIMO operation, the AP STA may receive, from a plurality of non-AP STAs, feedback information including Compressed Beamforming Feedback (CBF) and MU Exclusive Beamforming Report. The feedback information includes the average signal-to-interference-plus-noise ratio (SINR) for all space-time streams (STS) of each STA, the delta signal-to-noise ratio (SNR) representing the difference between each subcarrier and the average STS SINR, and the V-matrix, a compressed beamforming matrix per subcarrier (SC). The AP station may calculate the channel correlation between STAs based on beamforming feedback information, and may calculate the attenuated SNR accordingly to efficiently determine the user or STA selection method for multiple users. For the effective modulation and coding scheme (MCS) selection of each STA, the Received Bit Information Rate (RBIR) method based on symbol level mutual information, one of the link adaptation techniques, is adopted to propose a sub-optimal user selection and rate adaptation method.

Embodiments may provide how to select STAs with a sub-optimal system capacity between multiple STA within a BSS in MU-MIMO WLAN system. According to conventional technology, it is difficult to estimate SINR considering inter-user interference, leading to inaccurate or low MCS selection in PER-based MCS selection. Embodiments may solve this problem.

Embodiments can estimate the SINR for each subcarrier though channel correlation between STAs and provide an algorithm capable of user selection with a higher system capacity than the conventional user selection technique by proposing a rate adaptation applied with the RBIR-ESM technique.

Embodiments may provide calculation of inter-user interference per subcarrier (SC) between STAs through V-matrices of CSI feedback using channel correlation measurement method and calculation method subcarrier SINR for each STA within user group using the calculated inter-user interference. Based on the calculated SC SINR, RBIR-based Rate Adaptation scheme is also provided so that the effective SNR value and appropriate MCS level for each STA applied Received Bit Information Rate (RBIR) Effective SNR Mapping (ESM) mechanism can be determined. The determined effective SNR value for each STA may be used for user selection algorithm which is grouping the optimal user set using sub-optimal greedy searching algorithm.

According to some aspects, a wireless communication device for facilitating wireless communication, comprises processing circuitry configured to cause: transmitting a training frame; receiving a plurality of feedback frames from a plurality of stations in response to the training frame, wherein each of the plurality of feedback frames is associated with a respective one of the plurality of stations and includes channel quality information for an associated station; determining a plurality of groups based on the channel quality information in the plurality of feedback frames, wherein each of the plurality of groups is associated with a respective one of the plurality of stations and includes an associated station as a primary station and at least one secondary station; determining channel capacities of the plurality of groups; selecting a group of the plurality of groups based on the channel capacities of the plurality of groups; determining users of the selected group as MU-MIMO users; and transmitting a MU PPDU in MU-MIMO for the users of the selected group.

According to some aspects, determining the plurality of groups comprises: determining initial effective SNR values for the plurality of modulation schemes based on the channel quality information in the plurality of feedback frames, wherein each of the initial effective SNR values is for a modulation scheme of a station considering interference from another station of the plurality of stations; determining recommended modulation and coding scheme (MCS) values and final effective SNR values for the recommended MCS values based on the initial effective SNR values, wherein each of the recommended MCS values is recommended for a station considering interference from another station of the plurality of stations, each of the final effective SNR values is associated with a respective one of the recommended MCS values and an effective SNR for an associated recommended MCS value of a station considering interference from another station of the plurality of stations; determining channel capacities of the plurality of groups based on the final effective SNR values; and determining a plurality of groups based on the channel capacities of the plurality of groups.

According to some aspects, the at least one secondary station is determined to be included in a group based on channel capacity between a previous station in a group and the at least one secondary station, and the channel capacity between a previous station in a group and the at least one secondary station is determined based on the final effective SNR values.

According to some aspects, determining the initial effective SNR values for the plurality of modulation schemes comprises: determining average RBIR values for the plurality of modulation schemes based on the channel quality information in the plurality of feedback frames; and determining the initial effective SNR values for the plurality of modulation schemes based on the average RBIR values.

According to some aspects, determining average RBIR values for the plurality of modulation schemes based on the channel quality information in the plurality of feedback frames comprises: determining signal-to-interference-plus-noise ratio (SINR) values based on the channel quality information in the plurality of feedback frames, wherein each of the SINR values is a SINR for a subcarrier of a station considering interference from another station of the plurality of stations; determining received bit information rate (RBIR) values for a plurality of subcarriers, a plurality of OFDM symbols, a plurality of spatial streams, and a plurality of modulation schemes based on the SINR values; and determining average RBIR values for the plurality of modulation schemes based on the determined RBIR values.

According to some aspects, each of the plurality of feedback frames includes an average signal-to-noise ratio (SNR), a plurality of delta SNRs, and a plurality of V matrices for an associated station, each of the plurality of delta SNRs is associated with a respective one of a plurality of subcarriers and is a difference between a SNR for an associated subcarrier and the average SNR, and each of the plurality of V matrices is associated with a respective one of a plurality of subcarriers, According to some aspects, determining the signal-to-interference-plus-noise ratio (SINR) values based on the channel quality information in the plurality of feedback frames comprises: calculating SNR values for a plurality of subcarriers and for the plurality of stations based on the plurality of delta SNRs and the average signal-to-noise ratio (SNR) in the plurality of the feedback frames; determining channel correlations based on the plurality of V matrices, wherein each of the channel correlations is between a station of the plurality of stations and another station of the plurality of stations; and determining signal-to-interference-plus-noise ratio (SINR) values based on the calculated SNR values and the channel correlations.

According to some aspects, determining the received bit information rate (RBIR) values comprises: determining the received bit information rate (RBIR) values for a plurality of subcarriers, a plurality of OFDM symbols, a plurality of spatial streams, and a plurality of modulation schemes based on the SINR values by using a look-up table between SINR values and RBIR values.

According to some aspects, determining the initial effective SNR values for the plurality of modulation schemes comprises: determining the initial effective SNR values for the plurality of modulation schemes based on the average RBIR values by using a look-up table between RBIR values and SINR values.

According to some aspects, determining the plurality of groups further comprises: determining required SNR values for the plurality of modulation schemes, and wherein the recommended modulation and coding scheme (MCS) values and the final effective SNR values for the recommended MCS values are determined based on the initial effective SNR values and the required SNR values.

According to some aspects, transmitting the training frame comprises: transmitting a null data packet announcement frame; and transmitting a null data packet as the training frame a short interframe space (SIFS) after the null data packet announcement frame.

According to some aspects, the processing circuitry is further configured to cause: determining final MCS levels for the MU-MIMO users based on the recommended MCS values, wherein the final MCS levels are applied to the MU PPDU.

According to some aspects, the processing circuitry is further configured to cause: determining a plurality of steering matrices, wherein each of the plurality of steering matrices is associated with a respective one of the users of the selected group, wherein the plurality of steering matrices are applied to the MU PPDU.

According to some aspects, a wireless communication method for facilitating wireless communication, comprises: transmitting a training frame; receiving a plurality of feedback frames from a plurality of stations in response to the training frame, wherein each of the plurality of feedback frames is associated with a respective one of the plurality of stations and includes channel quality information for an associated station; determining a plurality of groups based on the channel quality information in the plurality of feedback frames, wherein each of the plurality of groups is associated with a respective one of the plurality of stations and includes an associated station as a primary station and at least one secondary station; determining channel capacities of the plurality of groups; selecting a group of the plurality of groups based on the channel capacities of the plurality of groups; determining users of the selected group as MU-MIMO users; and transmitting a MU PPDU in MU-MIMO for the users of the selected group.

According to some aspects, determining the plurality of groups comprises: determining initial effective SNR values for the plurality of modulation schemes based on the channel quality information in the plurality of feedback frames, wherein each of the initial effective SNR values is for a modulation scheme of a station considering interference from another station of the plurality of stations; determining recommended modulation and coding scheme (MCS) values and final effective SNR values for the recommended MCS values based on the initial effective SNR values, wherein each of the recommended MCS values is recommended for a station considering interference from another station of the plurality of stations, each of the final effective SNR values is associated with a respective one of the recommended MCS values and an effective SNR for an associated recommended MCS value of a station considering interference from another station of the plurality of stations; determining channel capacities of the plurality of groups based on the final effective SNR values; and determining a plurality of groups based on the channel capacities of the plurality of groups.

According to some aspects, the at least one secondary station is determined to be included in a group based on channel capacity between a previous station in a group and the at least one secondary station, and the channel capacity between a previous station in a group and the at least one secondary station is determined based on the final effective SNR values.

According to some aspects, determining the initial effective SNR values for the plurality of modulation schemes comprises: determining average RBIR values for the plurality of modulation schemes based on the channel quality information in the plurality of feedback frames; and determining the initial effective SNR values for the plurality of modulation schemes based on the average RBIR values.

According to some aspects, determining average RBIR values for the plurality of modulation schemes based on the channel quality information in the plurality of feedback frames comprises: determining signal-to-interference-plus-noise ratio (SINR) values based on the channel quality information in the plurality of feedback frames, wherein each of the SINR values is a SINR for a subcarrier of a station considering interference from another station of the plurality of stations; determining received bit information rate (RBIR) values for a plurality of subcarriers, a plurality of OFDM symbols, a plurality of spatial streams, and a plurality of modulation schemes based on the SINR values; and determining average RBIR values for the plurality of modulation schemes based on the determined RBIR values.

According to some aspects, each of the plurality of feedback frames includes an average signal-to-noise ratio (SNR), a plurality of delta SNRs, and a plurality of V matrices for an associated station, each of the plurality of delta SNRs is associated with a respective one of a plurality of subcarriers and is a difference between a SNR for an associated subcarrier and the average SNR, and each of the plurality of V matrices is associated with a respective one of a plurality of subcarriers.

According to some aspects, determining the signal-to-interference-plus-noise ratio (SINR) values based on the channel quality information in the plurality of feedback frames comprises: calculating SNR values for a plurality of subcarriers and for the plurality of stations based on the plurality of delta SNRs and the average signal-to-noise ratio (SNR) in the plurality of the feedback frames; determining channel correlations based on the plurality of V matrices, wherein each of the channel correlations is between a station of the plurality of stations and another station of the plurality of stations; and determining signal-to-interference-plus-noise ratio (SINR) values based on the calculated SNR values and the channel correlations.

According to some aspects, determining the received bit information rate (RBIR) values comprises: determining the received bit information rate (RBIR) values for a plurality of subcarriers, a plurality of OFDM symbols, a plurality of spatial streams, and a plurality of modulation schemes based on the SINR values by using a look-up table between SINR values and RBIR values.

According to some aspects, determining the initial effective SNR values for the plurality of modulation schemes comprises: determining the initial effective SNR values for the plurality of modulation schemes based on the average RBIR values by using a look-up table between RBIR values and SINR values.

Embodiments may provide accurate SINR estimation by predicting inter-user interference between users using compressed beamforming feedback information provided by each user in the WLAN DL MU-MIMO system since the feedback information intuitively reflects the channel condition. By converting SINR reflecting inter-user interference into the effective SNR value in AWGN channel through RBIR-ESM, it is possible to analyze the channel environment of each STA more accurately. This also enables accurate MCS prediction. By selecting a user group that maximizes system throughput through comparison of effective SNR values through a 2-dimensional Greedy search algorithm, the amount of computation required for user group selection can be significantly reduced compared to the Exhaustive Searching algorithm, thereby improving the performance of the MU-MIMO system.

BRIEF DESCRIPTION OF THE DRAWINGS

FIG. 11 shows an SNR inference matrix in accordance with an embodiment.

FIG. 12 shows an MCS inference matrix in accordance with an embodiment.

DETAILED DESCRIPTION

Figure 1:
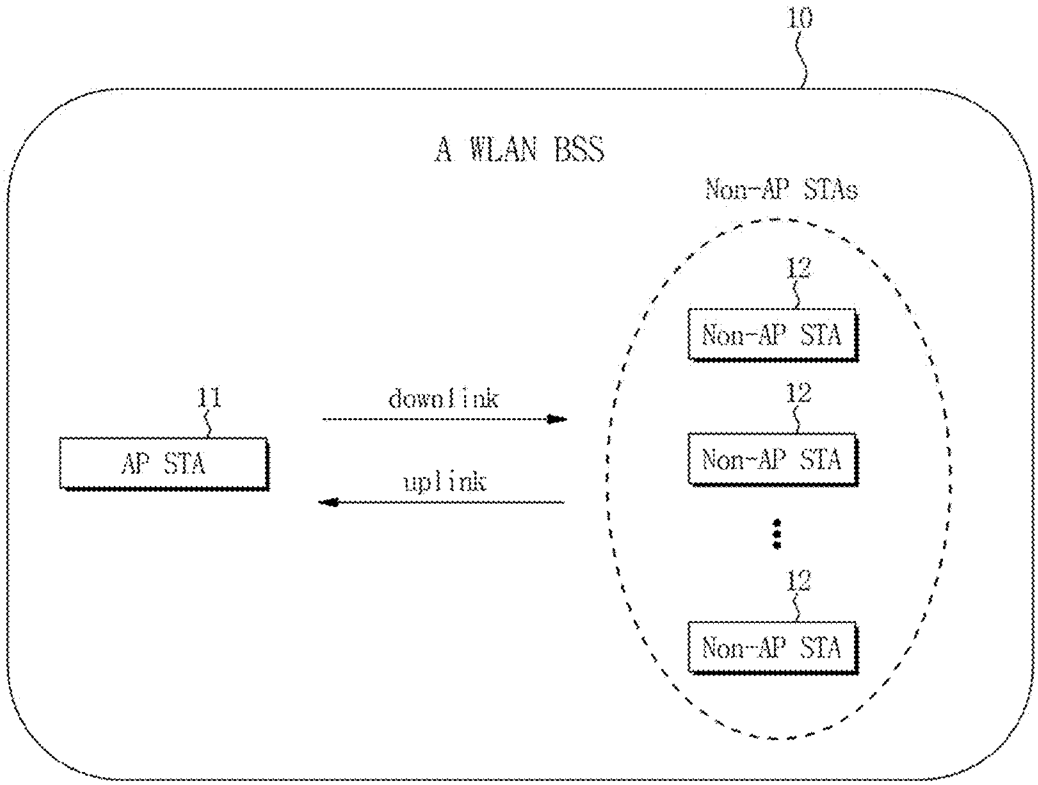
FIG. 1 illustrates a schematic diagram of an example wireless communication network.

The detailed description set forth below is intended to describe various implementations and is not intended to represent the only implementation. As those skilled in the art would realize, the described implementations may be modified in various different ways, all without departing from the scope of the present disclosure. Accordingly, the drawings and description are to be regarded as illustrative in nature and not restrictive. Like reference numerals designate like elements.

The below detailed description herein has been described with reference to a wireless LAN system according to the Institute of Electrical and Electronics Engineers (IEEE) 802.11 wireless standards including the current and future amendments. However, a person having ordinary skill in the art will readily recognize that the teachings herein are applicable to other network environments, such as cellular telecommunication networks and wired telecommunication networks.

In some embodiments, apparatus or devices such as an AP STA and a non-AP may include one or more hardware and software logic structure for performing one or more of the operations described herein. For example, the apparatuses or devices may include at least one memory unit which stores instructions that may be executed by a hardware processor installed in the apparatus and at least one processor which is configured to perform operations or processes described in the disclosure. The apparatus may also include one or more other hardware or software elements such as a network interface and a display device.

FIG. 1 illustrates a schematic diagram of an example wireless communication network.

Referring to FIG. 1, a basic service set (BSS) 10 may include a plurality of stations (STAs) including an access point (AP) station (AP STA) 11 and one or more non-AP station (non-AP STA) 12. For convenience, the non-AP STA may be referred to interchangeably as a user or an STA. The STAs may share a same radio frequency channel with one out of WLAN operation bandwidth options (e.g., 20/40/80/160/320 MHZ). Hereinafter, in some embodiments, the AP STA and the non-AP STA may be referred as AP and STA, respectively. In some embodiments, the AP STA and the non-AP STA may be collectively referred as station (STA).

The plurality of STAs may participate in multi-user (MU) transmission. In the MU transmission, the AP STA 11 may simultaneously transmit the downlink (DL) frames to the multiple non-AP STAs 12 in the BSS 10 based on different resources and the multiple non-AP STAs 12 may simultaneously transmit the uplink (UL) frames to the AP STA 11 in the BSS 10 based on different resources.

For the MU transmission, multi-user multiple input, multiple output (MU-MIMO) transmission or orthogonal frequency division multiple access (OFDMA) transmission may be used. In MU-MIMO transmission, with one or more antennas, the multiple non-AP STAs 12 may either simultaneously transmit to the AP STA 11 or simultaneously receive from the AP STA 11 independent data streams over the same subcarriers. Different frequency resources may be used as the different resources in the MU-MIMO transmission. In OFDMA transmission, the multiple non-AP STAs 12 may either simultaneously transmit to the AP STA 11 or simultaneously receive from the AP STA 11 independent data streams over different groups of subcarriers. Different spatial streams may be used as the different resources in MU-MIMO transmission.

Figure 2:
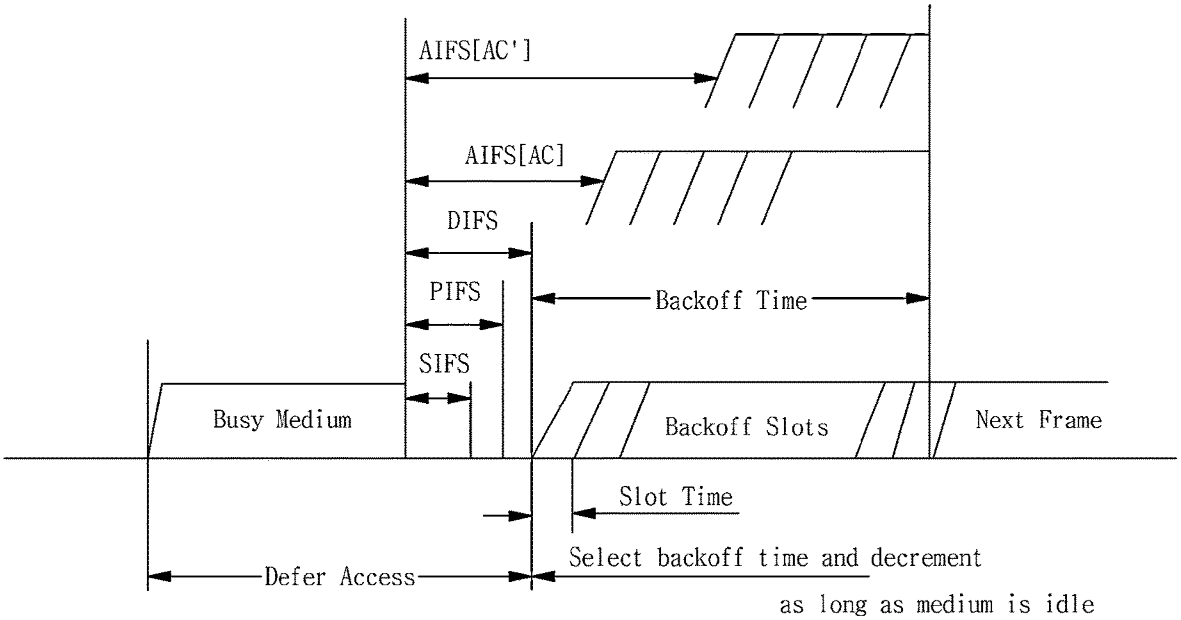
FIG. 2 illustrates an example of a timing diagram of interframe space (IFS) relationships between stations in accordance with an embodiment.

FIG. 2 illustrates an example of a timing diagram of interframe space (IFS) relationships between stations in accordance with an embodiment.

In particular, FIG. 2 shows a CSMA (carrier sense multiple access)/CA (collision avoidance) based frame transmission procedure for avoiding collision between frames in a channel.

A data frame, a control frame, or a management frame may be exchanged between STAs.

The data frame may be used for transmission of data forwarded to a higher layer. Referring to FIG. 2, access is deferred while the medium is busy until a type of IFS duration has elapsed. The STA may transmit the data frame after performing backoff if a distributed coordination function IFS (DIFS) has elapsed from a time when the medium has been idle.

The management frame may be used for exchanging management information which is not forwarded to the higher layer. Subtype frames of the management frame may include a beacon frame, an association request/response frame, a probe request/response frame, and an authentication request/response frame.

The control frame may be used for controlling access to the medium. Subtype frames of the control frame include a request to send (RTS) frame, a clear to send (CTS) frame, and an acknowledgement (ACK) frame. In the case that the control frame is not a response frame of the other frame, the STA may transmit the control frame after performing backoff if the DIFS has elapsed. If the control frame is the response frame of a previous frame, the WLAN device may transmit the control frame without performing backoff when a short IFS (SIFS) has elapsed. The type and subtype of frame may be identified by a type field and a subtype field in a frame control field.

On the other hand, a Quality of Service (QOS) STA may transmit the frame after performing backoff if an arbitration IFS (AIFS) for access category (AC), i.e., AIFS [AC] has elapsed. In this case, the data frame, the management frame, or the control frame which is not the response frame may use the AIFC[AC].

In some embodiments, a point coordination function (PCF) enabled AP STA may transmit the frame after performing backoff if a PCF IFS (PIFS) has elapsed. The PIFS duration may be less than the DIFS but greater than the SIFS.

Figure 3:
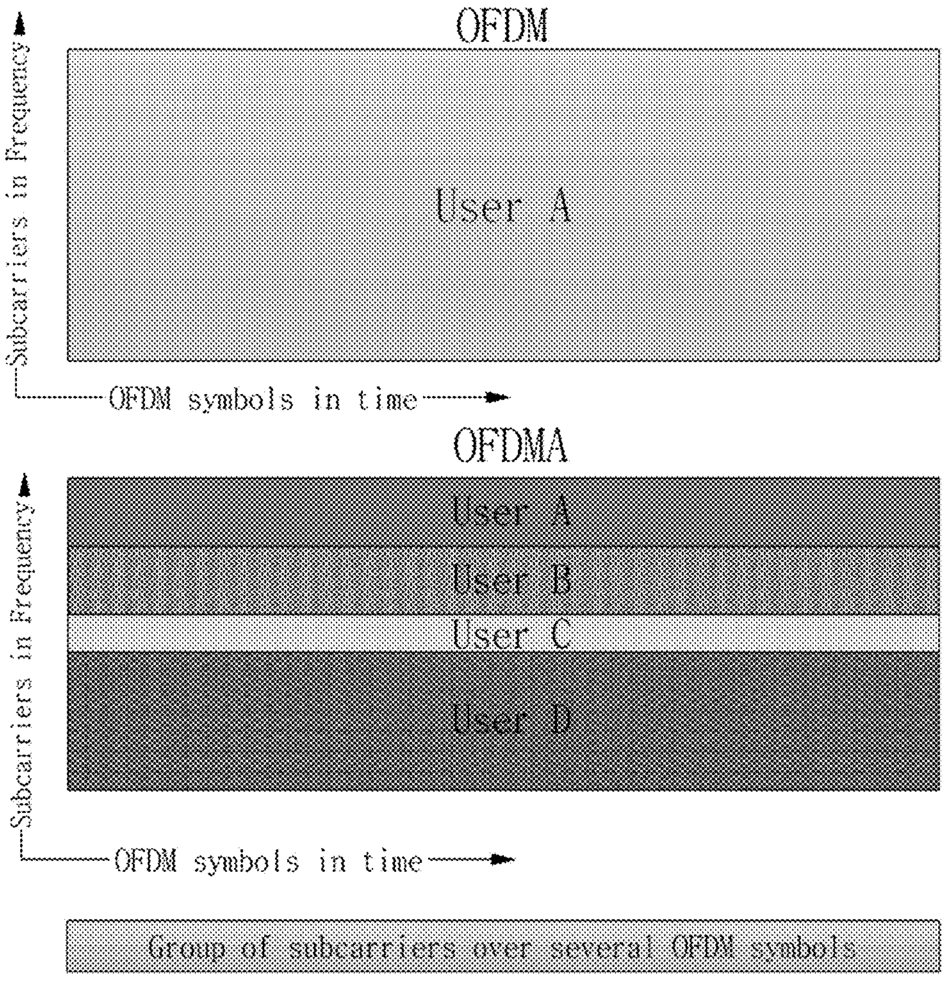
FIG. 3 shows an OFDM symbol and an OFDMA symbol in accordance with an embodiment.

FIG. 3 shows an OFDM symbol and an OFDMA symbol in accordance with an embodiment.

For multi-user access modulation, the orthogonal frequency division multiple access (OFDMA) for uplink and downlink has been introduced in IEEE 802.11ax standard known as High Efficiency (HE) WLAN and will be used in 802.11's future amendments such as EHT (Extreme High Throughput). One or more STAs may be allowed to use one or more resource units (RUs) throughout operation bandwidth to transmit data at the same time. As the minimum granularity, one RU may comprise a group of predefined number of subcarriers and be located at predefined location in orthogonal frequency division multiplexing (OFDM) modulation symbol. Here, non-AP STAs may be associated or non-associated with AP STA when responding simultaneously in the assigned RUs within a specific period such as a short inter frame space (SIFS). The SIFS may refer to the time duration from the end of the last symbol, or signal extension if present, of the previous frame to the beginning of the first symbol of the preamble of the subsequent frame.

The OFDMA is an OFDM-based multiple access scheme where different subsets of subcarriers may be allocated to different users, allowing simultaneous data transmission to or from one or more users with high accurate synchronization for frequency orthogonality. In OFDMA, users may be allocated different subsets of subcarriers which can change from one physical layer (PHY) protocol data unit (PPDU) to the next. In OFDMA, an OFDM symbol is constructed of subcarriers, the number of which is a function of the PPDU bandwidth. The difference between OFDM and OFDMA is illustrated in FIG. 3.

In case of UL MU transmission, given different STAs with their own capabilities and features, the AP STA may want to have more control mechanism of the medium by using more scheduled access, which may allow more frequent use of OFDMA/MU-MIMO transmissions. PPDUs in UL MU transmission (MU-MIMO or OFDMA) may be sent as a response to the trigger frame sent by the AP. The trigger frame may have STA's information and assign RUs and multiple RUS (MRUs) to STAs. The STA's information in the trigger frame may comprise STA Identification (ID), MCS (modulation and coding scheme), and frame length. The trigger frame may allow an STA to transmit trigger-based (TB) PPDU (e.g., HE TB PPDU or EHT TB PPDU) which is segmented into an RU and all RUs as a response of Trigger frame are allocated to the solicited non-AP STAs accordingly. Hereafter, a single RU and a multiple RU may be referred to as the RU. The multiple RU may include, or consist of, predefined two, three, or more RUs.

In EHT amendment, two EHT PPDU formats are defined: the EHT MU PPDU and the EHT TB PPDU. Hereinafter, the EHT MU PPDU and the EHT TB PPDU will be described with reference to FIG. 4A and FIG. 4B.

Figure 4A:
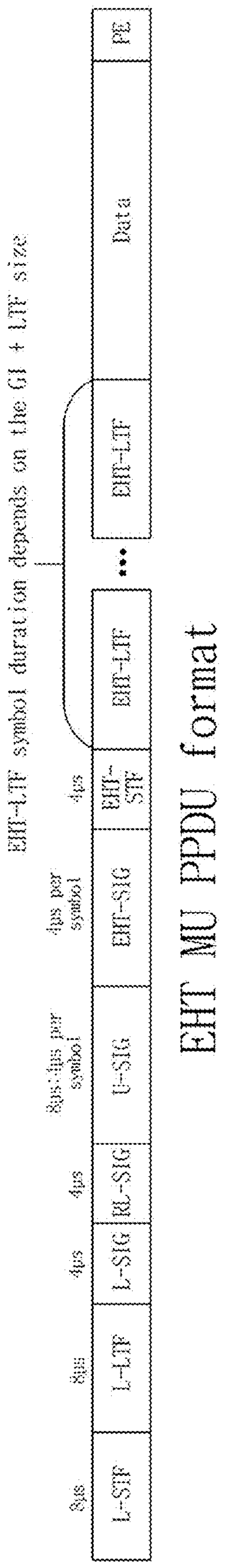
FIG. 4A illustrates the EHT MU PPDU format in accordance with an embodiment.

FIG. 4A illustrates the EHT MU PPDU format in accordance with an embodiment.

The EHT MU PPDU may be used for transmission to one or more users. The EHT MU PPDU is not a response to a triggering frame.

Referring to FIG. 4A, the EHT MU PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, a universal signal (U-SIG) field, and an EHT signal (EHT-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-SIG field immediately followed by the EHT-STF immediately followed by the EHT-LTF immediately followed by the data field immediately followed by the PE field.

The L-STF field may be utilized for packet detection, automatic gain control (AGC), and coarse frequency-offset correction.

The L-LTF field may be utilized for channel estimation, fine frequency-offset correction, and symbol timing.

The L-SIG field may be used to communicate rate and length information.

The RL-SIG field may be a repeat of the L-SIG field and may be used to differentiate an EHT PPDU from a non-HT PPDU, HT PPDU, and VHT PPDU.

The U-SIG field may carry information necessary to interpret EHT PPDUs.

The EHT-SIG field may provide additional signaling to the U-SIG field for STAs to interpret an EHT MU PPDU. Hereinafter, the U-SIG field, the EHT-SIG field, or both may be referred to as the SIG field.

The EHT-SIG field may include one or more EHT-SIG content channel. Each of the one or more EHT-SIG content channel may include a common field and a user specific field. The common field may contain information regarding the resource unit allocation such as the RU assignment to be used in the EHT modulated fields of the PPDU, the RUs allocated for MU-MIMO and the number of users in MU-MIMO allocations. The user specific field may include one or more user fields.

The user field for a non-MU-MIMO allocation may include a STA-ID subfield, a MCS subfield, a NSS subfield, a beamformed subfield, and a coding subfield. The user field for a MU-MIMO allocation may include a STA-ID subfield, a MCS subfield, a coding subfield, and a spatial configuration subfield.

The EHT-STF field may be used to improve automatic gain control estimation in a MIMO transmission.

The EHT-LTF field may enable the receiver to estimate the MIMO channel between the set of constellation mapper outputs and the receive chains.

The data field may carry one or more physical layer convergence procedure (PLCP) service data units (PSDUs).

The PE field may provide additional receive processing time at the end of the EHT MU PPDU.

Figure 4B:
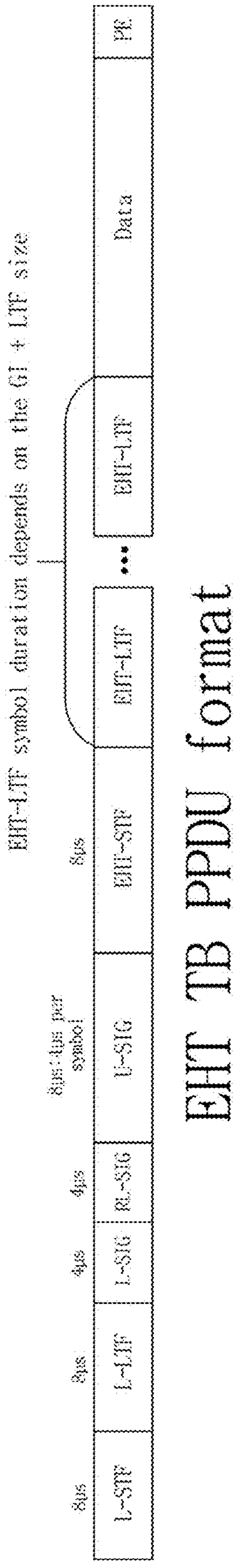
FIG. 4B illustrates the EHT TB PPDU format in accordance with an embodiment.

FIG. 4B illustrates the EHT TB PPDU format in accordance with an embodiment.

The EHT TB PPUD may be used for a transmission of a response to a triggering frame.

Referring to FIG. 4B, the EHT TB PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, and a universal signal (U-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-STF immediately followed by the EHT-LTF immediately followed by the data field immediately followed by the PE field. In the EHT TB PPUD, the EHT-SIG field is not present because the trigger frame conveys necessary information and the duration of the EHT_STF field in the EHT TB PPUD is twice the duration of the EHT-STF field in the EHT MU PPDU.

Description for each field in the EHT TB PPDU will be omitted because description for each field in the EHT MU PPDU is applicable to the EHT TB PPDU.

For EHT MU PPDU and EHT TB PPUD, when the EHT modulated fields occupy more than one 20 MHz channels, the pre-EHT modulated fields may be duplicated over multiple 20 MHz channels.

Hereinafter, electronic devices for facilitating wireless communication in accordance with various embodiments will be described with reference to FIG. 5.

Figure 5:
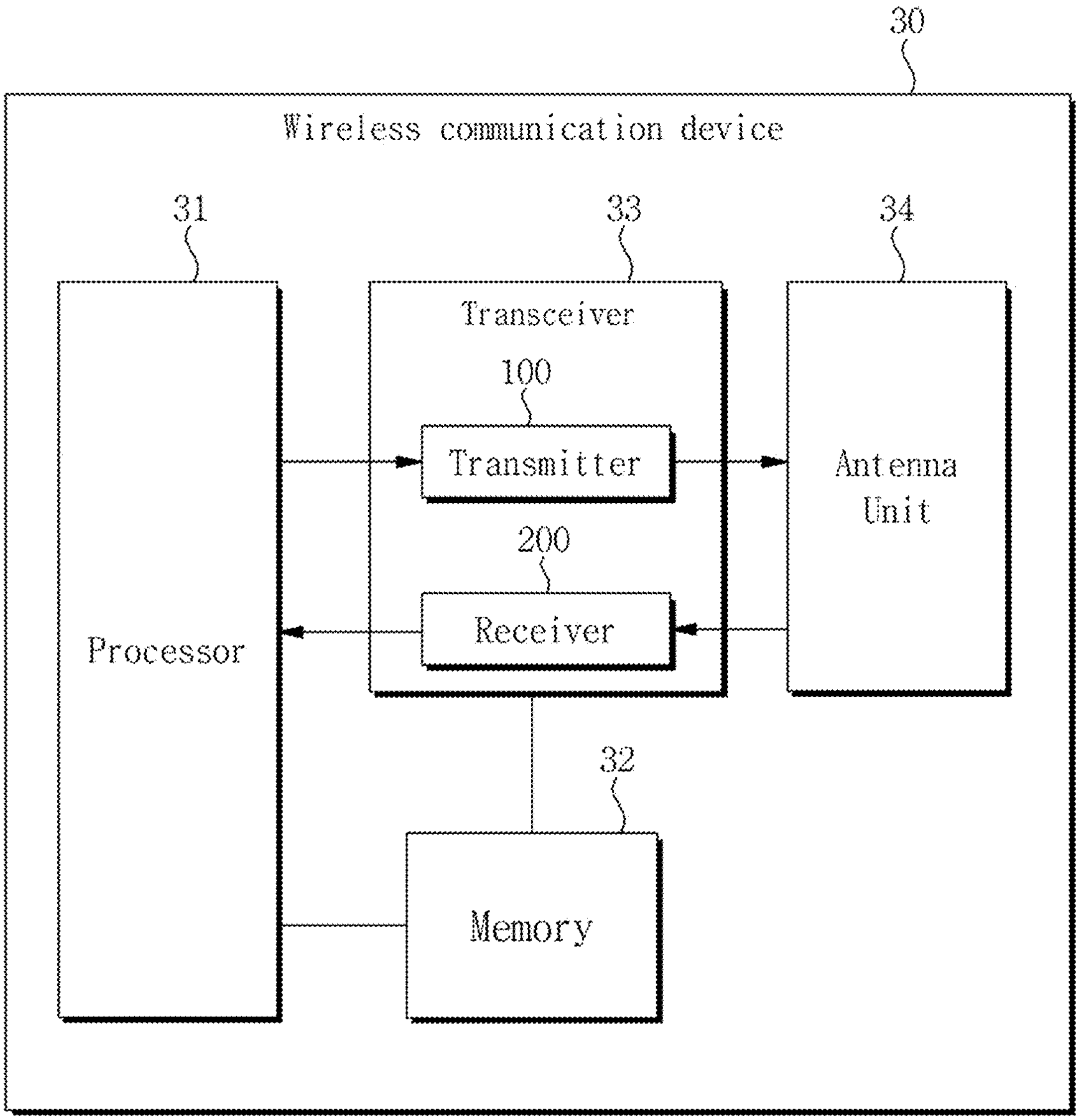
FIG. 5 is a block diagram of an electronic device for facilitating wireless communication in accordance with an embodiment.

FIG. 5 is a block diagram of an electronic device for facilitating wireless communication in accordance with an embodiment.

Referring to FIG. 5, an electronic device 30 for facilitating wireless communication in accordance with an embodiment may include a processor 31, a memory 32, a transceiver 33, and an antenna unit 34. The transceiver 33 may include a transmitter 100 and a receiver 200.

The processor 31 may perform medium access control (MAC) functions, PHY functions, RF functions, or a combination of some or all of the foregoing. In some embodiments, the processor 31 may comprise some or all of a transmitter 100 and a receiver 200. The processor 31 may be directly or indirectly coupled to the memory 32. In some embodiments, the processor 31 may include one or more processors.

The memory 32 may be non-transitory computer-readable recording medium storing instructions that, when executed by the processor 31, cause the electronic device 30 to perform operations, methods or procedures set forth in the present disclosure. In some embodiments, the memory 32 may store instructions that are needed by one or more of the processor 31, the transceiver 33, and other components of the electronic device 30. The memory may further store an operating system and applications. The memory 32 may comprise, be implemented as, or be included in a read-and-write memory, a read-only memory, a volatile memory, a non-volatile memory, or a combination of some or all of the foregoing.

The antenna unit 34 includes one or more physical antennas. When multiple-input multiple-output (MIMO) or multi-user MIMO (MU-MIMO) is used, the antenna unit 34 may include more than one physical antennas.

Figure 6:
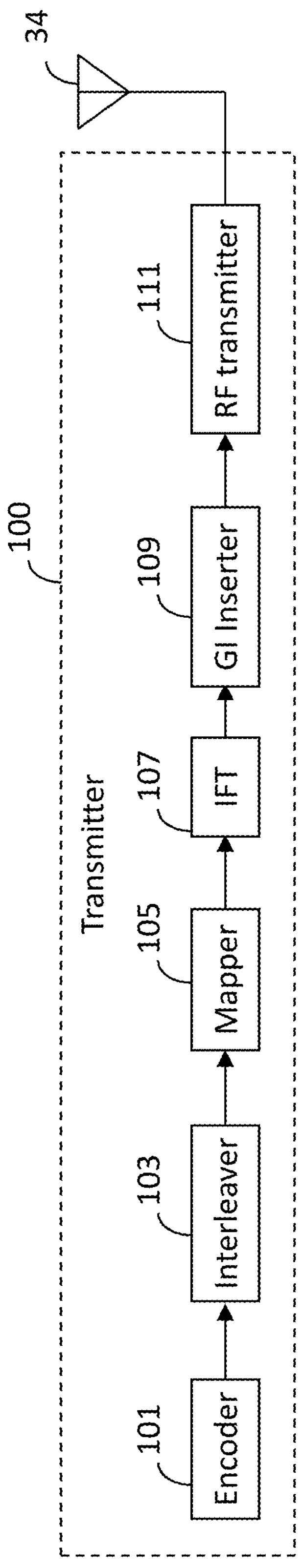
FIG. 6 shows a block diagram of a transmitter in accordance with an embodiment.

FIG. 6 shows a block diagram of a transmitter in accordance with an embodiment.

Figure 7:
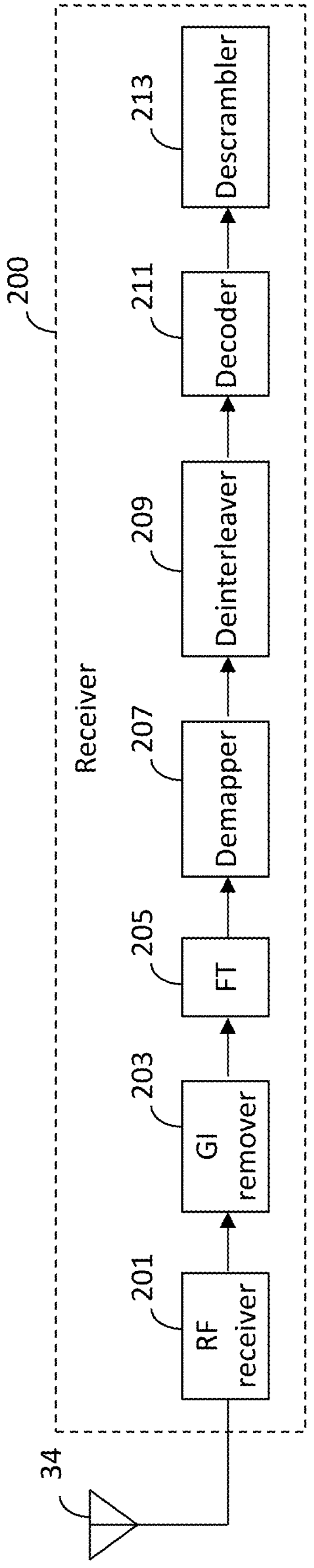
FIG. 7 shows a block diagram of a receiver in accordance with an embodiment.

Referring to FIG. 7, the transmitter 100 may include an encoder 101, an interleaver 103, a mapper 105, an inverse Fourier transformer (IFT) 107, a guard interval (GI) inserter 109, and an RF transmitter 111.

The encoder 101 may encode input data to generate encoded data. For example, the encoder 101 may be a forward error correction (FEC) encoder. The FEC encoder may include or be implemented as a binary convolutional code (BCC) encoder, or a low-density parity-check (LDPC) encoder.

The interleaver 103 may interleave bits of encoded data from the encoder 101 to change the order of bits, and output interleaved data. In some embodiments, interleaving may be applied when BCC encoding is employed.

The mapper 105 may map interleaved data into constellation points to generate a block of constellation points. If the LDPC encoding is used in the encoder 101, the mapper 105 may further perform LDPC tone mapping instead of the constellation mapping.

The IFT 107 may convert the block of constellation points into a time domain block corresponding to a symbol by using an inverse discrete Fourier transform (IDFT) or an inverse fast Fourier transform (IFFT).

The GI inserter 109 may prepend a GI to the symbol.

The RF transmitter 111 may convert the symbols into an RF signal and transmits the RF signal via the antenna unit 34.

FIG. 7 shows a block diagram of a receiver in accordance with an embodiment.

Referring to FIG. 7, the receiver 200 in accordance with an embodiment may include a RF receiver 201, a GI remover 203, a Fourier transformer (FT) 205, a demapper 207, a deinterleaver 209, and a decoder 211.

The RF receiver 201 may receive an RF signal via the antenna unit 34 and converts the RF signal into one or more symbols.

The GI remover 203 may remove the GI from the symbol.

The FT 205 may convert the symbol corresponding a time domain block into a block of constellation points by using a discrete Fourier transform (DFT) or a fast Fourier transform (FFT) depending on implementation.

The demapper 207 may demap the block of constellation points to demapped data bits. If the LDPC encoding is used, the demapper 207 may further perform LDPC tone demapping before the constellation demapping.

The deinterleaver 209 may deinterleave demapped data bits to generate deinterleaved data bits. In some embodiments, deinterleaving may be applied when BCC encoding is used.

The decoder 211 may decode the deinterleaved data bits to generate decoded bits. For example, the decoder 211 may be an FEC decoder. The FEC decoder may include a BCC decoder or an LDPC decoder. In order to support the HARQ procedure, the decoder 211 may combine a retransmitted data with an initial data.

The descrambler 213 may descramble the descrambled data bits based on a scrambler seed.

In DL MU-MIMO WLAN system, the AP STA may group an appropriate number of stations (STAs) with optimal system throughput among overall STAs in the BSS to transmit data to the multiple users. For the most ideal user selection, selected STAs should have channel orthogonality in which channels between each other are orthogonal. If the channels of the selected STAs are not orthogonal to each other, this may cause inter-user interference in concurrent transmission. The IEEE 802.11 WLAN system enables multi-stream transmission to multiple users though zero-forcing beamforming (ZFBF) for DL MU-MIMO transmission.

Hereinafter, a channel sounding procedure for multi-user beamforming performing ZFBF in accordance with an embodiment will be described with reference to FIG. 8. The beamformer may be an AP STA or a non-AP STA. The beamformee may be an AP STA or a non-AP STA.

Figure 8:
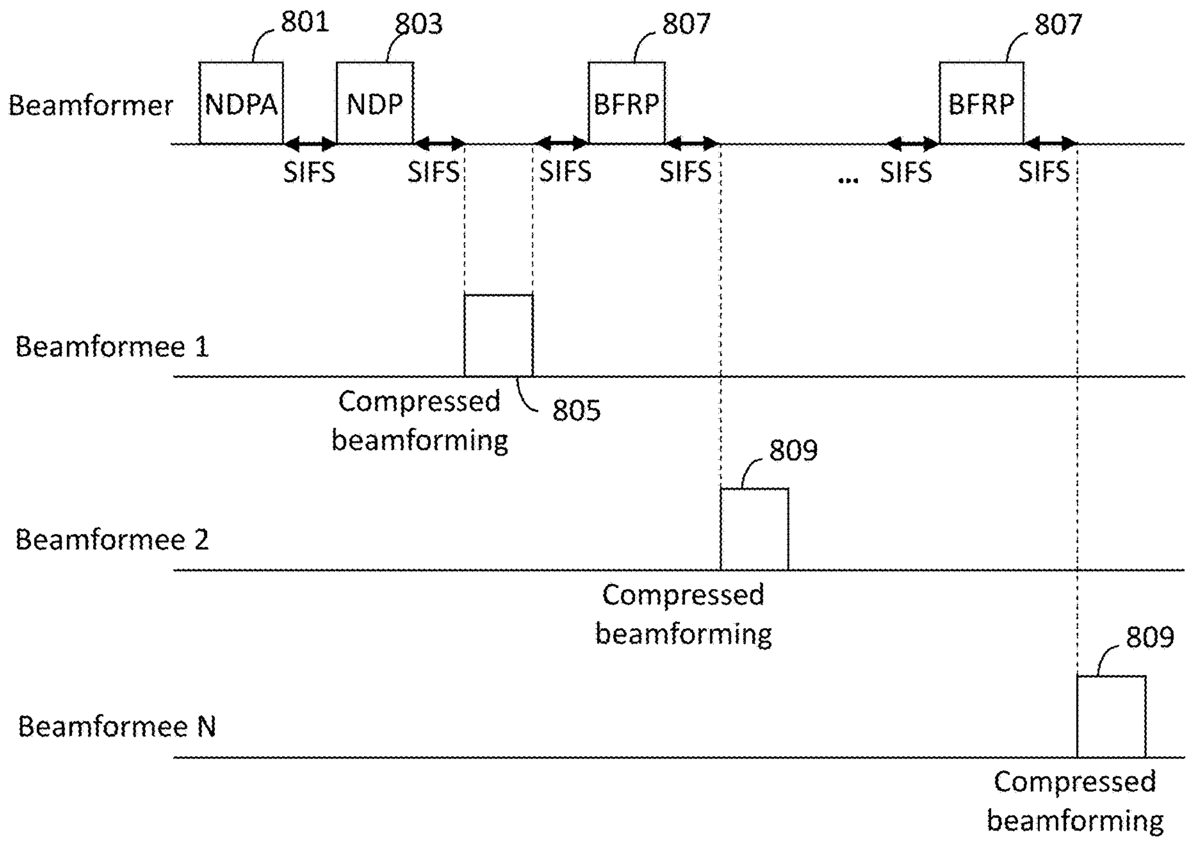
FIG. 8 shows a sounding procedure with one or more beamformees in accordance with an embodiment.

FIG. 8 shows a sounding procedure with one or more beamformees in accordance with an embodiment.

The AP as a beamformer may notify beamformees or STAs in advance that it will proceed with channel sounding through a null data packet announcement (NDPA) frame 801 and transmit a null data packet (NDP) 803 after SIFS time.

Upon receiving the NDP, each of beamformees may transmit a compressed beamforming action frame packet 805 and 809 to the AP in a predetermined order. For convenience, the compressed beamforming action frame packet may be referred to interchangeably compressed beamforming report or a High efficiency (HE) Compressed Beamforming/CQI frame. In some embodiments, the 1st beamformee may transmit the compressed beamforming report 805 a SIFS after the NDP 803 and i-th beamformee may transmit the compressed beamforming report 809 a SIFS after the (i−1)-th beamforming report poll frame 807 (i=2 . . . . N). In some embodiments, N beamformees may simultaneously transmit compressed beamforming reports a SIFS after receiving a BFRP trigger frame.

In some embodiments, the compressed beamforming report frame 805 and 809 may include compressed beamforming report field and the MU Exclusive Beamforming Report field.

The compressed beamforming report field may carry a plurality of average SNR fields and a plurality of compressed beamforming feedback matrix V field. The plurality of average SNR fields may be associated with a respective one of a plurality of space-time streams. Each of the plurality of average SNR fields may carry an average SNR for an associated space-time stream. The plurality of compressed beamforming feedback matrix V fields may be associated with a respective one of a plurality of subcarriers. Each of the plurality of compressed beamforming feedback matrix V fields may carry a compressed beamforming feedback matrix V for an associated subcarrier for use by the beamformer to determine steering matrices Q. Each beamformee may measure the average stream SNR and angle information including steering matrices Q for the plurality of subcarriers. Each angle information for an associated subcarrier or each of steering matrices Q may be converted into a V matrix for generating a steering matrix in the AP STA.

The MU Exclusive Beamforming Report field may carry explicit feedback in the form of delta SNRs. The MU Exclusive Beamforming Report field may include a plurality of delta SNR fields which are associated with a respective one of a plurality of space-time streams and a respective one of a plurality of subcarriers. Each of the plurality of delta SNR fields may carry delta SNR for an associated space-time stream and for an associated subcarrier. The delta SNR for an associated space-time stream and for an associated subcarrier may correspond to a difference between the average SNR for the associated space-time stream and a measured SNR for the associated space-time stream and for the associated subcarrier.

For user grouping of MU-MIMO system, the user selection algorithm for the optimal user group and the rate adaptation (RA) scheme may be used to determine the MCS level, bandwidth (BW), and number of spatial streams ($N_{ss}$) for the selected users. In order to select the appropriate STA for the user selection, it may be required to have a high PHY rate based on the STA with sufficient backlogged traffic information and be the same channel BW. In addition, the length of the transmission packet may be required to be similar. The selected STAs may go through a rate adaptation process to determine the PHY rate with the most optimal throughput, such as MCS, BW, and $N_{ss}$. In this scenario, the widely known rate adaptation is a PER-based RA, and the PER performance is predicted based on the SINR value measured for each STA to select MCS, BW, and $N_{ss}$ with performance below PER 0.1. However, since the interference effect between the selected STAs is not considered, the overall PHY rate may be reduced by lowering the MCS level of the selected STA, or a group thrashing phenomenon in which the user grouping may be broken due to a packet error.

Hereinafter, an RBIR-based rate adaptation technique based on SINR value calculation that considers inter-user interference between selected STAs will be described.

First, a per-subcarrier MU-SINR calculation in accordance with an embodiment will be described with reference to FIG. 9.

Figure 9:
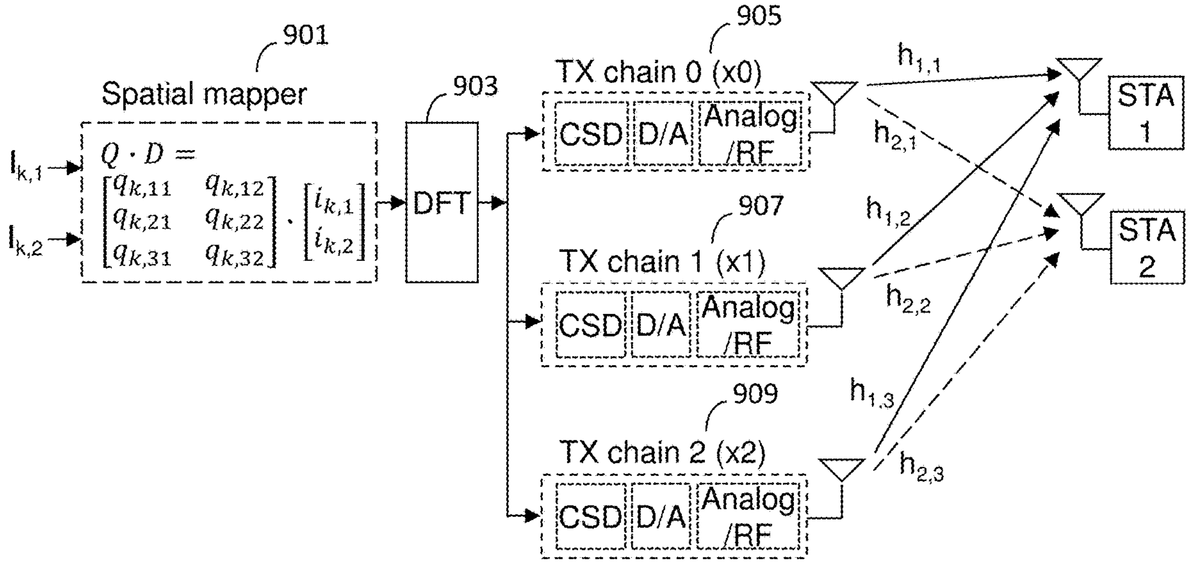
FIG. 9 shows the system model of DL MU-MIMO with one AP STA with three transmitted antennas and two non-AP stations with single antenna in accordance with an embodiment.

FIG. 9 shows the system model of DL MU-MIMO with one AP STA with three transmitted antennas and two non-AP stations with single antenna in accordance with an embodiment.

Referring to FIG. 9, the AP STA includes a spatial mapper 901, a DFT 903, three transmit chains 905, 907, and 909. Each of three transmit chains 905, 907, and 909 includes a Cyclic shift diversity (CSD) module, digital-to-analog (D/A) module, and Analog/RF module. The spatial mapper 901 may correspond to a mapper 105 in FIG. 6. The DFT 903 may correspond to IFT 107 in FIG. 6. The Cyclic shift diversity (CSD) module may be located between the IFT 107 and the GI inserter 109 in FIG. 6. The digital-to-analog (D/A) module and the Analog/RF module may correspond to RF transmitter 111 in FIG. 6.

The spatial mapper 901 may apply Q matrix to transmission data D to perform mapping between per-user transmission data D and transmission chains. The transmitted signals from three transmit antennas go through the channel H.

The channel matrix H may be defined as $N_r$x$N_t$ matrix where $N_t$ is the number of transmit antennas at the AP side and $N_r$ is the number of non-AP stations with single antenna.

For simplicity, assume that the number of transmitted antennas is three ($N_t=3$) and the number of stations with single antenna for multi-user transmission is two ($N_r=2$). The AP station may support two data spatial streams ($N_{ss}=2$) so that the concurrent transmission for two users is enabled.

The singular value decomposition (SVD) of the channel matrix H is as follows:

$$H = \begin{bmatrix} h_{11} & h_{12} & h_{13} \\ h_{21} & h_{22} & h_{23} \end{bmatrix} = U \cdot \Lambda \cdot \tilde{V}^* \qquad \text{Equation 1}$$

In Equation 1, U and $\tilde{V}^*$ are $N_r \times N_r$ and $N_t \times N_t$ complex unitary matrices, respectively. $\Lambda$ is an $N_r \times N_t$ matrix with singular values on diagonal elements.

Information signals for two data streams are $i_{k,1}$ and $i_{k,2}$, respectively. A steering matrix for MU-MIMO transmission may be defined as matrix Q, then the received signal for each STA may be modeled through the conventional wireless channel model in Equation 2:

$$\begin{bmatrix} y_{u1} \\ y_{u2} \end{bmatrix} = \begin{bmatrix} h_{11} & h_{12} & h_{13} \\ h_{21} & h_{22} & h_{23} \end{bmatrix} \cdot \begin{bmatrix} q_{11} & q_{12} \\ q_{21} & q_{22} \\ q_{31} & q_{32} \end{bmatrix} \cdot \begin{bmatrix} i_1 \\ i_2 \end{bmatrix} + \begin{bmatrix} n_1 \\ n_2 \end{bmatrix} = \begin{bmatrix} h_1 \\ h_2 \end{bmatrix} [q_1 \; q_2] \begin{bmatrix} i_1 \\ i_2 \end{bmatrix} + \begin{bmatrix} n_1 \\ n_2 \end{bmatrix} \qquad \text{Equation 2}$$

For equation 2, the received signal from STA 1 may be expressed in Equation 3 and the received signal from STA 2 may be expressed in Equation 4.

$$y_{u1} = h_1 \cdot q_1 \cdot i_1 + h_1 \cdot q_2 \cdot i_2 + n_1 \qquad \text{Equation 3}$$

$$y_{u2} = h_2 \cdot q_2 \cdot i_2 + h_2 \cdot q_1 \cdot i_1 + n_2 \qquad \text{Equation 4}$$

In Equation 4, the parts of $h_1 \cdot q_2 \cdot i_2$ in Equation 3 and $h_2 \cdot q_1 \cdot i_1$ in Equation 4 may be the inter-user interference signal. The STA1 and STA2 may mitigate the interference signal for the reception of desired signal by using ZFBF method which is applied to the AP STA. According to channel inversion of zero-forcing scheme, the channel may be decomposed into independent subchannel when a channel inversion matrix is applied as a precoding matrix. For general use-case of zero-forcing, pseudo inversion may be applied because the channel matrix is rectangular. The Pseudo inversion of zero-forcing $H^\dagger$ may be given by the following Equation 5:

$$H^\dagger = H^* \cdot (H \cdot H^*)^{-1} \qquad \text{Equation 5}$$

In Equation 5, $[\bullet]^*$ is the transpose conjugate of matrix. Since the full channel information is available at the non-AP STA side, each STA may calculate the channel information for beamforming transmission at the AP side and the calculated compressed beamforming matrix of $\tilde{V}^*$ may be transmitted to the AP side, for example by using the compressed beamforming report frame. To compute a precoding matrix W, the equivalent channel matrix derived from the V matrix and $\Lambda$ matrix from the SVD of the channel matrix H for each STA may be considered. In the DL MU-MIMO WLAN system, the AP STA may receive a feedback including both the V matrix and $\Lambda$ matrix in response to a training frame such as NDP from non-AP STAs. The equivalent channel matrices for all the users may be grouped into a composite matrix $H_{EQ}=[V_1\Lambda_1 \;\; V_2\Lambda_2]$. The zero-forcing pre-coding solution may be given by in Equation 6:

[Equation 6]

$$W_{ZF} = H_{EQ}(H_{EQ}^* H_{EQ})^{-1} = \frac{1}{1-|\Theta_{prj}|^2} \cdot [\, V_1 \;\; V_2 \,] \cdot \begin{bmatrix} \frac{1}{\sigma_{user1}} & \frac{-\Theta_{prj}}{\sigma_{user2}} \\ \frac{-\overline{\Theta_{prj}}}{\sigma_{user1}} & \frac{1}{\sigma_{user2}} \end{bmatrix}$$

In Equation 6, $\Theta_{prj}$ is a projection of $V_1$ and $V_2$. For example, $\Theta_{prj}$ may be equal to $\langle V_1 \cdot V_2 \rangle = V_1^* \cdot V_2$. $\sigma_{user1}$ is the singular value of STA1 and $\sigma_{user2}$ is the singular value of STA2. Equation 6 may be replaced by the following Equation 7:

$$W_{ZF} = [\, W_{ZF,1} \;\; W_{ZF,2} \,] = \begin{bmatrix} \frac{1}{\sigma_{user1}} \cdot \frac{1}{1-|\Theta_{prj}|^2} \cdot \left(V_1 - \overline{\Theta_{prj}} \cdot V_2\right) & \frac{1}{\sigma_{user2}} \cdot \frac{1}{1-|\Theta_{prj}|^2} \cdot (V_2 - \Theta_{prj} \cdot V_1) \end{bmatrix} \qquad \text{Equation 7}$$

By replacing the steering matrix Q in each STA of Equation 2 with the following equation $q=[q_1 \; q_2]=[(V_1 - \overline{\Theta_{prj}} \cdot V_2)(V_2 - \Theta_{prj} \cdot V_1)]$, the received signal with interference cancellation at each STA may be calculated as shown in the following Equation 8:

$$\begin{bmatrix} y_{u1} \\ y_{u2} \end{bmatrix} = \left[\, \sigma_{user1} \cdot \left(1-|\Theta_{prj}|^2\right) \;\; \sigma_{user2} \cdot \left(1-|\Theta_{prj}|^2\right) \,\right] \begin{bmatrix} i_1 \\ i_2 \end{bmatrix} + \begin{bmatrix} n_1 \\ n_2 \end{bmatrix} \qquad \text{Equation 8}$$

From Equation 8, SINR calculation based on ZF algorithm may be achieved. The singular values $\sigma_{user1}$ and $\sigma_{user2}$ may be the elements of feedback matrix $\Lambda$ which are included in compressed beamforming report frame. The value of $\Theta_{prj}$ may be the projection result between feedback matrix $V_1$ and $V_2$. The projection value between the two V matrices may imply the channel correlation between two STAs since the V matrix decomposed using SVD from channel matrix H intuitively reflects users' channel condition. Therefore, Signal-to-interference-plus-noise ratio (SINR) at j-th subcarrier for the 1st and 2nd STAs is given by the Equation 9 and Equation 10, respectively.

$$SINR_{u1,j} = \frac{\left(\sigma_{user1,j} \cdot \left(1-\left|\Theta_{prj}^j\right|^2\right)\right)^2 P}{N_0} = \frac{\sigma_{user1,j}^2 \cdot P}{N_0} \cdot \left(1-\left|\Theta_{prj}^j\right|^2\right)^2 \qquad \text{Equation 9}$$

$$SINR_{u2,j} = \frac{\left(\sigma_{user2,j} \cdot \left(1-\left|\Theta_{prj}^j\right|^2\right)\right)^2 P}{N_0} = \frac{\sigma_{user2,j}^2 \cdot P}{N_0} \cdot \left(1-\left|\Theta_{prj}^j\right|^2\right)^2 \qquad \text{Equation 10}$$

In Equation 9 and Equation 10, P is a signal power and $N_0$ is a noise variance. Equations 9 and 10 may be replaced since the $$\frac{\sigma_{user,j}^2 \cdot P}{N_0}$$

can be expressed as feedback information combination between an average stream SNR $\overline{\mathrm{SNR}}_{u_k}$ in dB value for k-th user within compressed beamforming report and delta $$SNR\ \Delta SNR_{u_k}^j$$

in dB value for j-th subcarrier of k-th user within MU exclusive beamforming report. Thus, the SINR for j-th subcarrier of k-th user regarding participated m-th user can be simplified as shown in Equation 11:

$$SINR_{u_k u_m}^j = 10^{\frac{\overline{SNR}_{u_k} + \Delta SNR_{u_k}^j}{10}} \cdot \left(1 - \left|\Theta_{prj,u_k,u_m}^j\right|^2\right)^2 \quad \text{Equation 11}$$

In Equation 11, $$\Delta SNR_{u_k}^j$$

is a difference between $\overline{\mathrm{SNR}}_{u_k}$ and a SNR for the j-th subcarrier of the k-th user.

$$\Theta_{prj,u_k u_m}^j$$

is channel correlation for j-th subcarrier between k-th user and m-th user, respectively. Since $\overline{\Theta_{prj}}$ is the conjugate of $$\Theta_{prj},\ \left|\Theta_{prj,u_k u_m}^j\right|^2 = \left|\Theta_{prj,u_m u_k}^j\right|^2$$

may be established.

The RBIR effective SNR mapping (ESM) is one of the link adaptation techniques using symbol-level mutual information to enable PER estimation and MCS selection. In order to predict the accurate PER performance through the calculated SINR value, the effective SNR value may be computed by using RBIR approach. For all M-ary modulated symbols on each subcarrier, the symbol-level mutual information may be calculated and then the effective SNR may be achieved through the de-mapping average mutual information to effective SNR. The effective SNR mapping in accordance with RBIR algorithm may be given by Equation 12.

$$\Phi(SINR; M) = \log_2 M - \frac{1}{M}\sum_{m=1}^{M} E_U\left\{\log_2\left(\sum_{k=1}^{M}\exp\left[|U|^2 - \left|\sqrt{SINR}(s_k - s_m) + U\right|^2\right]\right)\right\} \quad \text{Equation 12}$$

In Equation 12, Φ(SINR; M) is a RBIR for M-ary modulation. M is the number of constellation points for the MCS, U is the complex Gaussian random variable with zero mean and variance of 1, and $s_k$ and $s_m$ are the constellation point with normalized energy.

Figure 10:
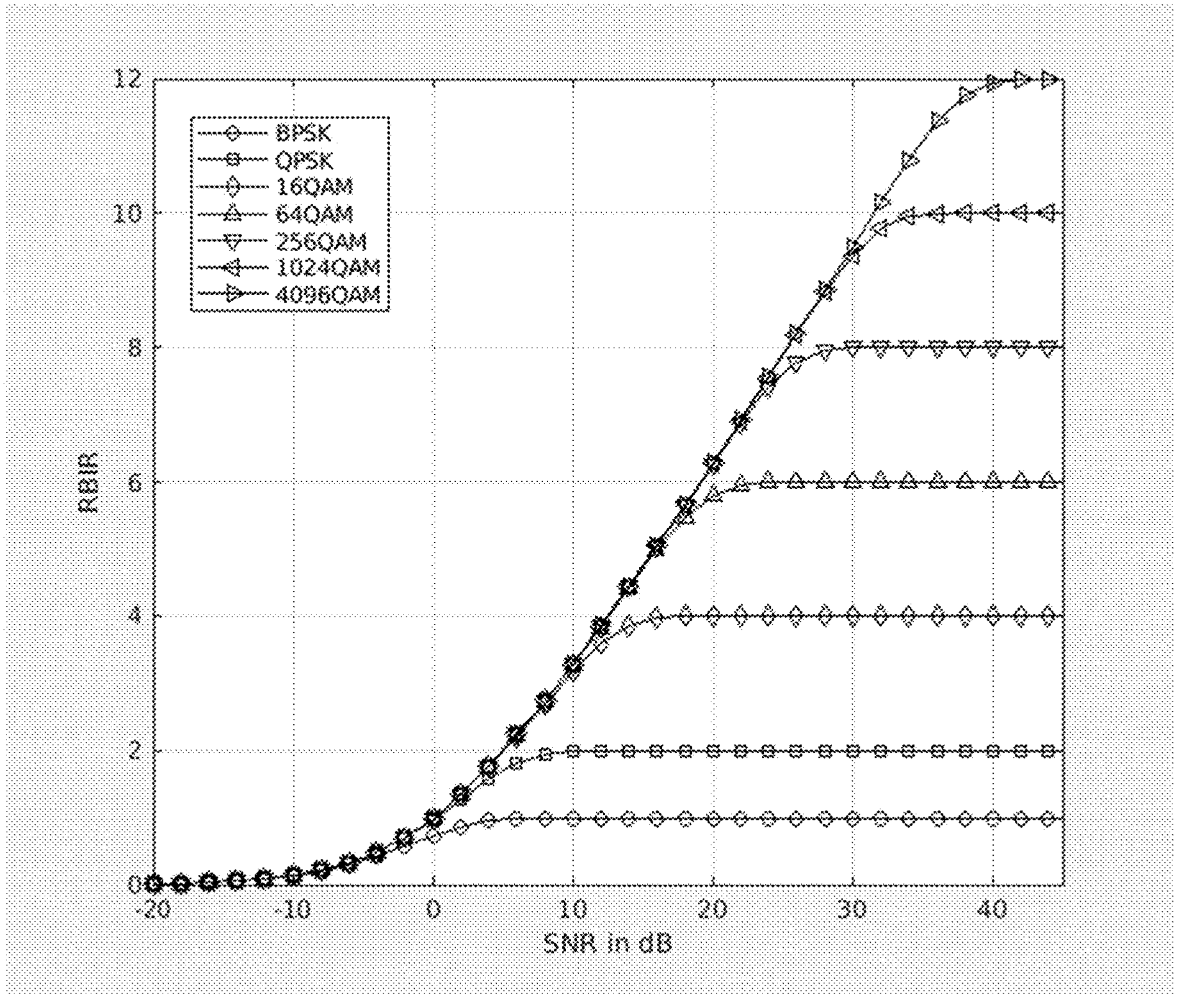
FIG. 10 shows simulated RBIR ESM results for various modulation orders in accordance with an embodiment.

FIG. 10 shows simulated RBIR ESM results for various modulation orders based on Equation 12.

To elaborate, FIG. 10 is a diagram illustrating RBIR ESM curves for RBIR value versus input SINR value in accordance with some embodiments of the present disclosure. As shown in the example embodiment, the diagram includes RBIR in bits shown on a y-axis and SNR in decibels (dB) shown on an x-axis. Each modulation scheme can start around −20 dB at 0 bits and follow similar curves until about −5 dB. Binary Phase-shift keying (BPSK) (represented in FIG. 10 by the curve with circular data points) that levels off at 1 bit at about 5 dB. Quadrature Phase Shift Keying (QPSK) (represented in FIG. 10 by the curve with square data points) levels off at 2 bits at about 10 dB. 16 Quadrature amplitude modulation (16-QAM) (represented in FIG. 10 by the curve with diamond data points) levels off at 4 bits at about 15 dB. 64-QAM (represented in FIG. 10 by the curve with the upward pointing triangle data points) levels off at 6 bits at more than 20 dB. 256-QAM (represented in FIG. 10 by the curve with the downward pointing triangle data points) levels off at 8 bits at about 30 dB. 1024-QAM (represented in FIG. 10 by the curve with the leftward pointing triangle data points) levels off at 10 bits at about 35 dB. 4096-QAM (represented in FIG. 10 by the curve with the rightward pointing triangle data points) levels off at 12 bits at about 40 dB.

Average RBIR may be calculated by mapping per-subcarrier SINR value as shown in the following Equation 13:

$$RBIR = \frac{1}{N \cdot T \cdot N_{ss}} \sum_{i_{ss}=1}^{N_{ss}} \sum_{t=1}^{T} \sum_{n=1}^{N} \Phi(SINR(i_{ss}, n, t); M) \quad \text{Equation 13}$$

In Equation 13, N, T, $N_{ss}$ are the number of subcarriers, the number of OFDM symbols, and the number of spatial streams, respectively. When the average RBIR value is determined, the effective SNR can be obtained by inversely mapping it as shown in the following Equation 14.

$$SNR_{eff}(M) = \Phi^{-1}(RBIR; M) \quad \text{Equation 14}$$

Therefore, by applying per-subcarrier SINR for each STA of Equation 11 into Equation 13, each of RBIR values for modulation level M may be calculated. And then, effective SNR values for each modulation level may be achieved by using Equation 14. The reason why the effective SNR values are calculated separately for each modulation level is that the RBIR values calculated in Equation 13 may have different effective SNR values depending on the modulation level as shown in FIG. 10. Referring to the calculated seven effective SNR values for seven modulation levels, the appropriate MCS level may be determined by comparing the calculated seven effective SNR values with the required SNR values for MCS levels in Table 1. In some embodiments, the appropriate MCS decision may be made by using the following Equation 15:

$$MCS\ \text{selection} = \underset{mcs}{\operatorname{argmin}}\left|SNR_{per_{awgn}}(MCS; BW, GI, LTF) - SNR_{eff}(\mathrm{mod}(MCS))\right| \quad \text{Equation 15}$$

$$\text{Subject to } SNR_{per_{awgn}}(MCS; BW, GI, LTF) \le SNR_{eff}(\mathrm{mod}(MCS))$$

In Equation 15, $SNR_{per\_awgn}$ is the required SNR value on AWGN channel for input MCS, bandwidth, guard interval and LTF type, and $SNR_{eff}(mod(MCS))$ is the effective SNR value at the modulation order for the specific MCS level.

Table 1 shows required SNR values in dB on AWGN channel for the 20 MHz bandwidth, 0.8 μs GI, 2×LTF in accordance with an embodiment.

TABLE 1

| MCS level | Modulation | # of bits per symbol | LUT column index, $idx_{LUT}$ | Required SNR (dB) |
|---|---|---|---|---|
| 0 | BPSK | 1 | 1 | 3 |
| 1 | QPSK | 2 | 2 | 6 |
| 2 | QPSK | 2 | 2 | 9 |
| 3 | 16-QAM | 4 | 3 | 12 |
| 4 | 16-QAM | 4 | 3 | 15 |
| 5 | 64-QAM | 6 | 4 | 19 |
| 6 | 64-QAM | 6 | 4 | 21 |
| 7 | 64-QAM | 6 | 4 | 22 |
| 8 | 256-QAM | 8 | 5 | 26 |
| 9 | 256-QAM | 8 | 5 | 28 |
| 10 | 1024-QAM | 10 | 6 | 31 |
| 11 | 1024-QAM | 10 | 6 | 33 |
| 12 | 4096-QAM | 12 | 7 | 36 |
| 13 | 4096-QAM | 12 | 7 | 38 |

After the MCS decision is made by Equation 15, the selected MCS and effective SNR values may be stored in the MCS inference matrix $MCS_{inf}$ and SNR inference matrix $SNR_{inf}$, respectively.

FIG. 11 shows an SNR inference matrix in accordance with an embodiment.

As shown in FIG. 11, the SNR inference matrix may include a 2-dimensional rectangular array of elements arranged in rows and columns. The element in the k-th row and the m-th column may include the effective SNR $SNR_{eff,u_k u_m}$ of the k-th user considering interference from the m-th user.

FIG. 12 shows an MCS inference matrix in accordance with an embodiment.

As shown in FIG. 12, may the MCS inference matrix include a 2-dimensional rectangular array of elements arranged in rows and columns. The element in the k-th row and the m-th column may include the selected MCS $MCS_{u_k u_m}$ for the k-th user considering interference from the m-th user.

Figure 13:
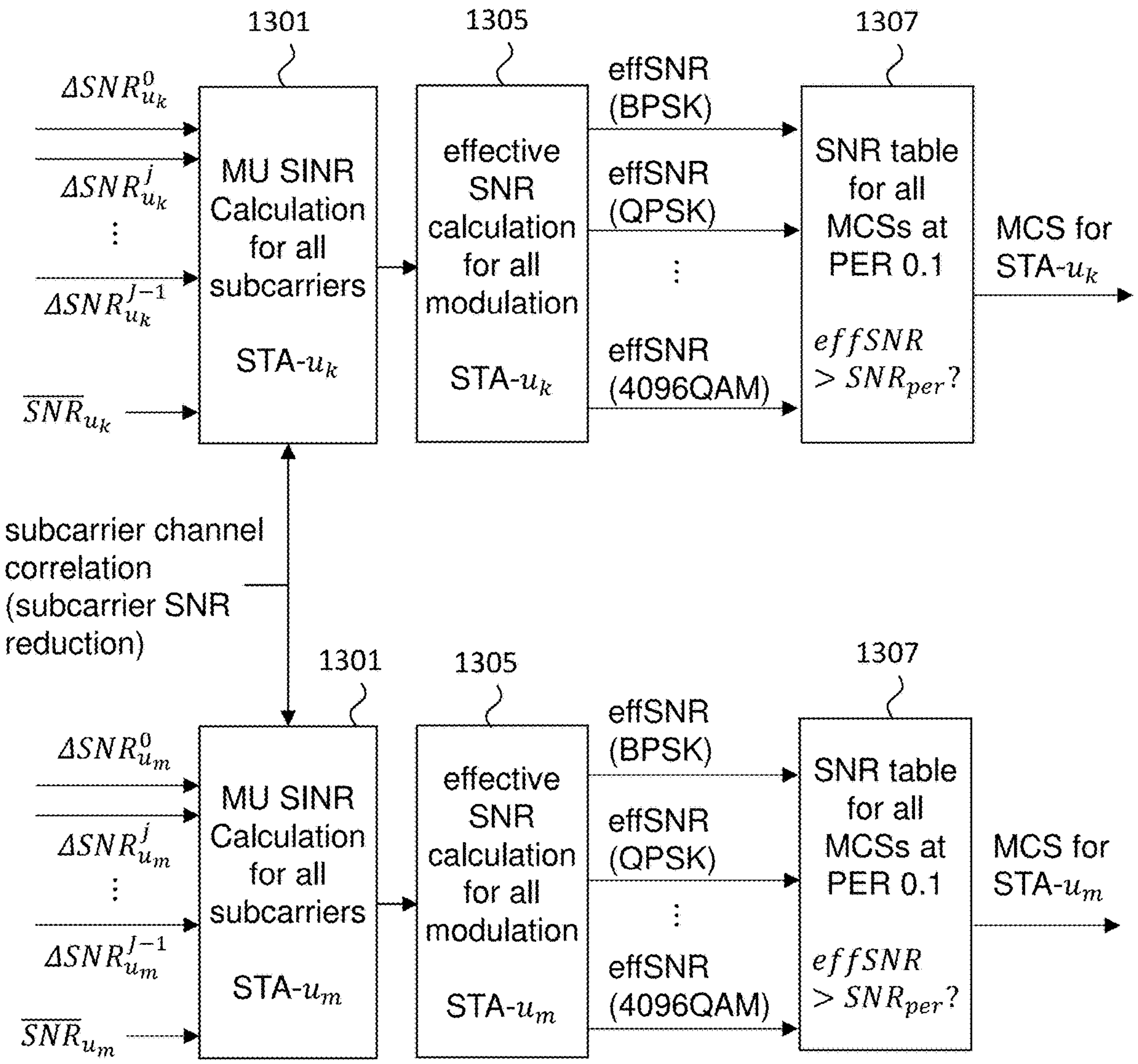
FIG. 13 is a block diagram showing an RBIR-based rate adaptation in accordance with an embodiment.

FIG. 13 is a block diagram showing an RBIR-based rate adaptation in accordance with an embodiment.

As shown in FIG. 13, the AP may comprise a plurality of SINR calculators 1301, a plurality of effective SNR calculators 1305, and a plurality of MCS selectors 1307. The plurality of SINR calculators 1301 may comprise a k-th SINR calculator for the k-th user and an m-th SINR calculator for the m-th user. The plurality of effective SNR calculators 1305 may comprise a k-th effective SNR calculator for the k-th user and a m-th effective SNR calculator for the m-th user. The plurality of MCS selectors 1307 may comprise a k-th MCS selector for the k-th user and a m-th MCS selector for the m-th user.

The k-th SINR calculator for the k-th user may receive the average stream SNR $\overline{SNR}_{u_k}$ for the k-th user, the delta $$SNR\ \Delta SNR^j_{u_k}$$

for a plurality of subcarriers of k-th user, and the channel correlation $$\Theta^j_{prj,u_k u_m}$$

for a plurality of subcarriers between k-th user and m-th user. The k-th SINR calculator may calculate a $$SINR\ SINR^j_{u_k u_m}$$

of the j-th subcarrier for the k-th user considering interference from the m-th user according to Equation 11.

The m-th SINR calculator for the m-th user may receive the average stream SNR $\overline{SNR}_{u_m}$ for the m-th user, the delta $$SNR\ \Delta SNR^j_{u_m}$$

for a plurality of subcarriers of m-th user, and the channel correlation $$\Theta^j_{prj,u_m u_k}$$

for a plurality of subcarriers between the k-th user and the m-th user. The m-th SINR calculator may calculate a $$SINR\ SINR^j_{u_m u_k}$$

of the j-th subcarrier for the m-th user considering interference from the k-th user according to Equation 11.

The k-th effective SNR calculator for the k-th user may calculate the effective SNRs $SNR_{eff}(M)$ for all modulation schemes for the k-th user. In some embodiments, the k-th effective SNR calculator for the k-th user may calculate the average RBIR for the k-th user considering interference from the m-th user according to Equation 13. And then, the k-th effective SNR calculator for the k-th user may calculate the effective SNR $SNR_{eff}(M)$ for all modulation schemes for the k-th user based on the average RBIR according to FIG. 10 or a RBIR-to-SINR table which can be obtained based on FIG. 10.

The m-th effective SNR calculator for the m-th user may calculate the effective SNRs $SNR_{eff}(M)$ of all modulation schemes for the m-th user. In some embodiments, the m-th effective SNR calculator for the m-th user may calculate the average RBIR for the m-th user considering interference from the k-th user according to Equation 13. And then, the m-th effective SNR calculator for the m-th user may calculate the effective SNR $SNR_{eff}(M)$ for all modulation schemes for the m-th user based on the average RBIR according to FIG. 10 or a RBIR-to-SINR table which can be obtained based on FIG. 10.

The k-th MCS selector for the k-th user may select an appropriate MCS $MCS_{u_k u_m}$ for the k-th user considering interference from the m-th user according to Equation 15.

The m-th MCS selector for the m-th user may select an appropriate MCS $MCS_{u_m u_k}$ for the m-th user considering interference from the k-th user according to Equation 15.

Figure 14:
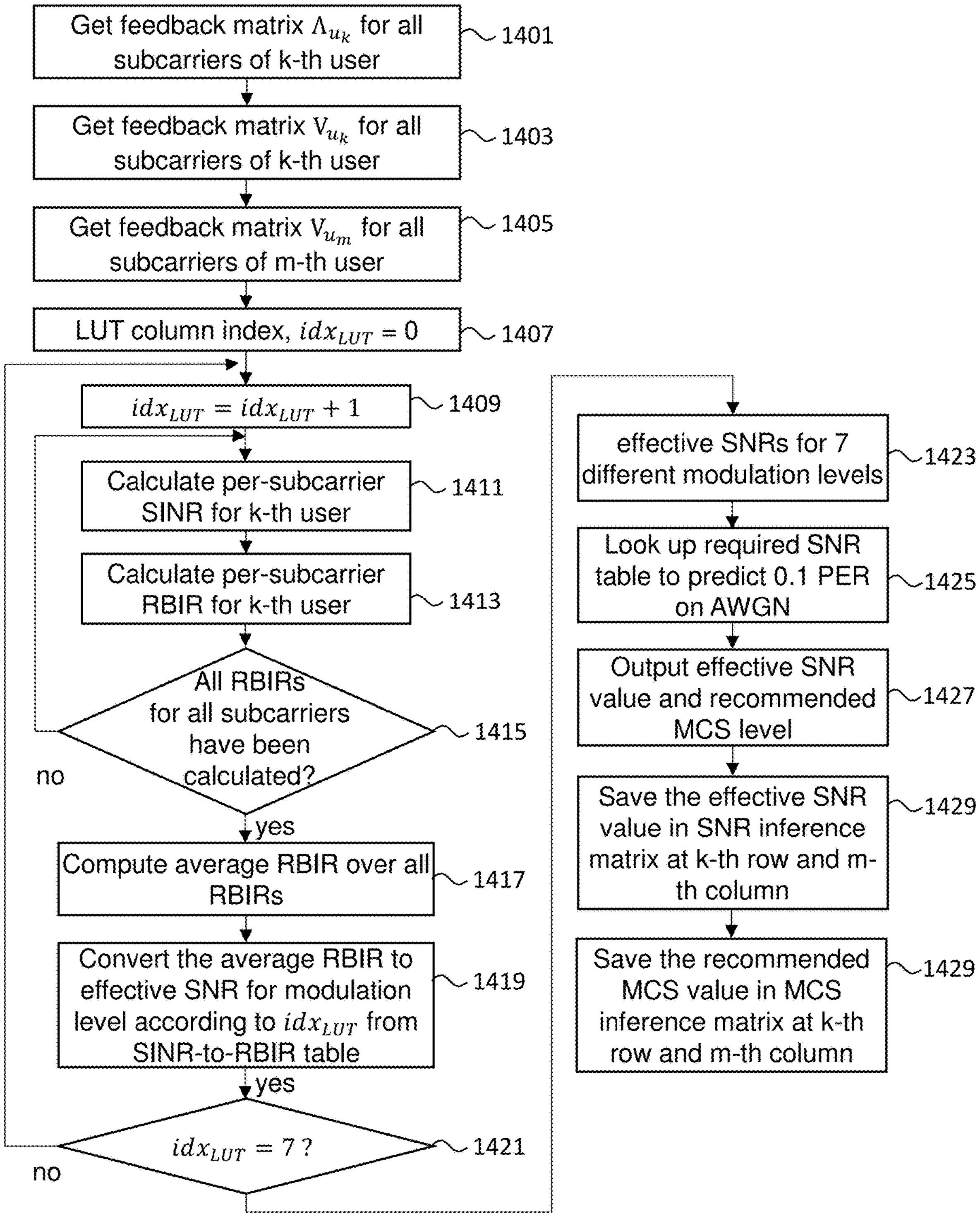
FIG. 14 is a flow chart showing an RBIR-based rate adaptation in accordance with an embodiment.

FIG. 14 is a flow chart showing an RBIR-based rate adaptation in accordance with an embodiment.

At 1401, the AP STA may get a feedback matrix $\Lambda_{u_k}$ for all subcarriers of k-th user. In some embodiments, the feedback matrix $\Lambda_{u_k}$ may comprise the average stream SNR $\overline{SNR}_{u_k}$ for the k-th user and the delta $$SNR\ \Delta SNR_{u_k}^{j}$$

for a plurality of subcarriers of k-th user.

At 1403, the AP STA may get a feedback matrix $V_{u_k}$ for all subcarriers of k-th user.

At 1405, the AP STA may get feedback matrix $V_{u_m}$ for all subcarriers of m-th user.

At 1407, the AP STA may set a look-up table (LUT) column index $idx_{LUT}$ equal to 0.

At 1409, the AP STA may increase the index $idx_{LUT}$ by 1.

At 1411, the AP STA may calculate the $$SINR\ SINR_{u_k u_m}^{j}$$

of the j-th subcarrier for the k-th user considering interference from the m-th user according to Equation 11.

At 1413, the AP STA may calculate RBIR values for k-th user according to Equation 12 or a look-up table which can be derived from Equation 12. The RBIR values may be associated with a respective one of a plurality of subcarriers and a respective one of a plurality of OFDM symbols and a respective one of a plurality of spatial streams (or space-time streams).

At 1415, the AP STA may check whether all RBIRs have been calculated. If all RBIRs have been calculated, the AP STA may go to the operation S1417. Otherwise, the AP STA may go to the operation 1411.

At 1417, the AP STA may compute the average RBIR over all RBIRs according to Equation 13.

At 1419, the AP STA may convert the average RBIR to effective SNR for modulation level according to $idx_{LUT}$ by using a RBIR-to-SNR table which can be derived by FIG. 10.

At 1421, the AP STA may check whether the index $idx_{LUT}$ is equal to a maximum number of the index. In some embodiment, the maximum number may be 7. If index $idx_{LUT}$ is equal to a maximum number of the index, the AP STA may go to the operation 1423. Otherwise, the AP STA may go back to the operation 1409 and then perform operations 1409 to 1419.

At 1423, the AP STA may obtain effective SNRs for a plurality of different modulation levels via operations 1401 to 1421. In some embodiments, the plurality of different modulation levels may include BPSK, QPSK, 16-QAM, 64-QAM, 256-QAM, 1024-QAM, 4096-QAM. In some embodiments, the number of the plurality of different modulation levels may be 7.

At 1425, the AP STA may look up the SNR table as shown in Table 1 to satisfy 0.1 PER on AWGN to obtains required SNRs for a plurality of MCS levels.

At 1427, the AP STA may select a recommended MCS $MCS_{u_k u_m}$ for the k-th user considering interference from the m-th user according to Equation 15 to output the recommended MCS level and the effective SNR value $SNR_{eff,u_k u_m}$ for the recommended MCS level.

At 1429, the AP STA may save the effective SNR value $SNR_{eff,u_k u_m}$ in the SNR inference matrix at k-th row and m-th column.

At 1431, the AP STA may save the recommended MCS value $MCS_{u_k u_m}$ in the MCS inference matrix at k-th row and m-th column.

Hereinafter, MU selection with 2-dimensional Greedy Search will be described with reference to FIG. 15, FIG. 16, and FIG. 17.

Figure 15:
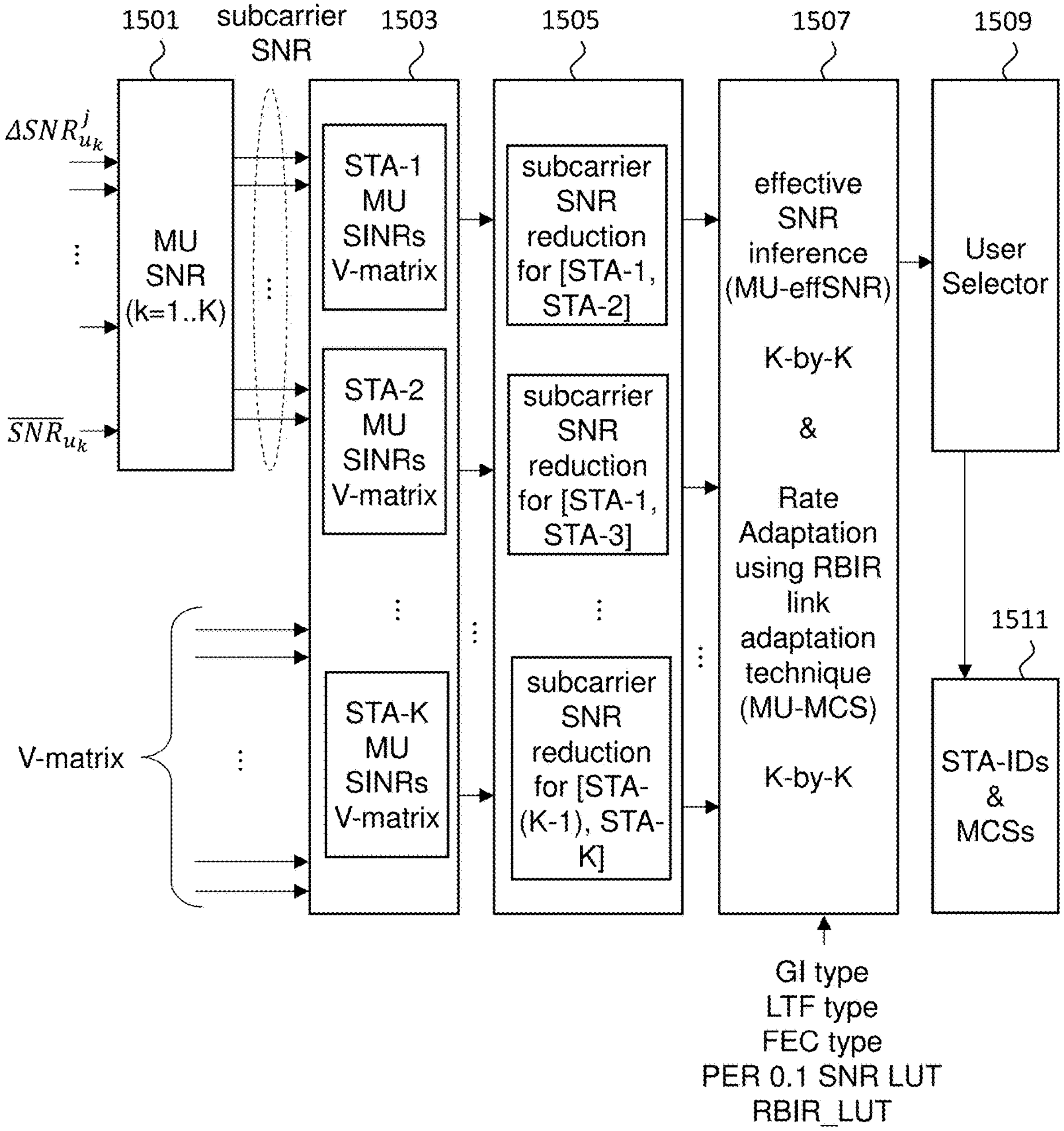
FIG. 15 illustrates a block diagram of the MU selection with Greedy Search algorithm in accordance with an embodiment.

FIG. 15 illustrates a block diagram of the MU selection with Greedy Search algorithm in accordance with an embodiment.

As shown in FIG. 13, the AP may comprise a MU SNR calculator 1501, a MU channel information storage 1503, a MU SINR calculator 1505, a MU MCS selector 1507, a MU-MIMO user selector 1509, and a MU-MIMO MCS selector 1511.

The MU SNR calculator 1501 may receive the average stream SNR $\overline{SNR}_{u_k}$ for the k-th user, the delta $$SNR\ \Delta SNR_{u_k}^{j}$$

for a plurality of subcarriers of k-th user (k=1 . . . . K, j=1 . . . . N). The MU SNR calculator may calculate a $$SNR\ \left(\overline{SNR}_{u_k} + \Delta SNR_{u_k}^{j}\right)$$

of the j-th subcarrier for the k-th user (k=1 . . . . K, j=1 . . . . N). Here, K is the total number of users and N is the total number of subcarriers.

The MU channel information storage 1503 may receive and store $$SNR\ \left(\overline{SNR}_{u_k} + \Delta SNR_{u_k}^{j}\right)$$

of the j-th subcarrier for the k-th user, and a V matrix $$V_{u_k}^{j}$$

for the j-th subcarrier for the k-th user (k=1 . . . . K, j=1 . . . . N).

The MU SINR calculator 1505 may calculate a $$SINR\ SINR_{u_k u_m}^{j}$$

for the j-th subcarrier of the m-th user considering interference from the k-th user according to Equation 11, for all combinations of k and m (k≠m).

The rate adaptation module 1507 may calculate the effective SNR value $SNR_{eff,u_k u_m}$ and the recommended MCS value $MCS_{u_k u_m}$ as described above. The rate adaptation module 1507 may save the effective SNR value $SNR_{eff,u_k u_m}$ at k-th row and m-th column in the SNR inference matrix and save the recommended MCS value $MCS_{u_k u_m}$ at k-th row and m-th column in the MCS inference matrix.

The MU-MIMO user selector 1509 may perform a Greedy search algorithm for MU selection in accordance with an embodiment and select a group of users for MU-MIMO transmission.

The MU-MIMO MCS selector 1511 may select a final MCS level for the selected group of users for MU-MIMO transmission.

Hereinafter, the operations of the MU-MIMO user selector 1509 will be described with reference to FIG. 16 and FIG. 17.

Figure 16:
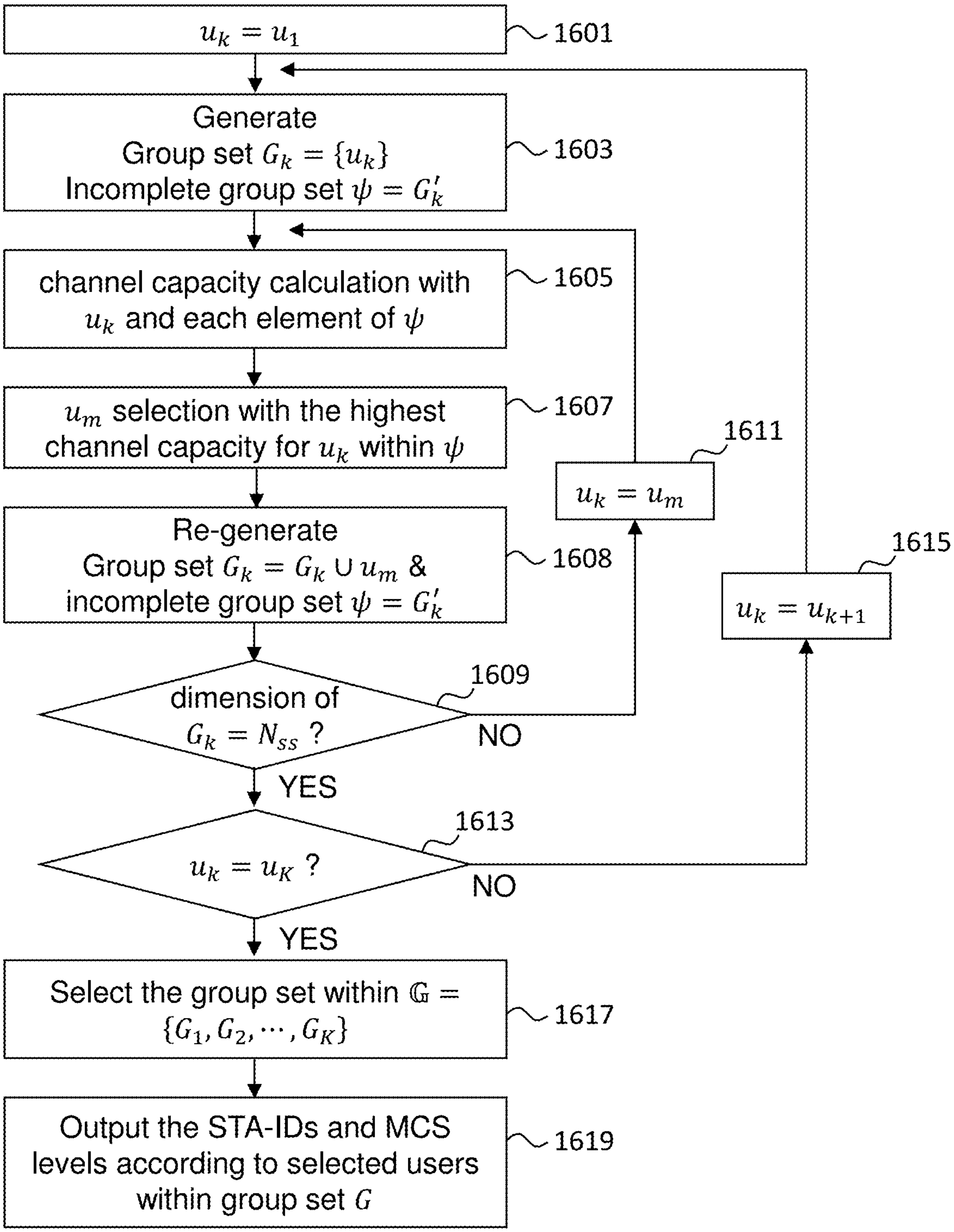
FIG. 16 illustrates a flow chart of the MU selection with Greedy Search algorithm in accordance with an embodiment.

FIG. 16 illustrates a flow chart of the MU selection with Greedy Search algorithm in accordance with an embodiment.

For simplicity, assuming that the total number of STAs in BSS is five (K=5), the number of transmitted antennas $N_t$ at the AP is three, the number of spatial streams $N_{ss}$ is two, and all STAs have single antenna, the dimensions of $SNR_{inf}$ and $MCS_{inf}$ may be configured as K×K matrices. For k-th main STA and m-th sub-STA, the calculated effective SNR and MCS value may be stored in k-th row and m-th column of the $SNR_{inf}$ and $MCS_{inf}$. After the $SNR_{inf}$ matrix is completed, a user group of two users with the best system throughput for all combinations of STAs may be found among K users in a BSS. Since the elements of $SNR_{inf}$ are the effective SNR value considered with the channel correlation between k-th user and m-th user, may be directly applied to channel capacity calculation.

At 1601, the AP may set the current user $u_k$ equal to $u_1$.

At 1603, the AP may generate the group set $G_k$ with the element $u_k$, $G_k=\{u_k\}$ and generate the incomplete group set $\psi=G_k'$, where $G_k'$ is a set of all users except those included in $G_k$.

At 1605, the AP may calculate the channel capacity $C(u_k, u_m)$ between $u_k$ and $u_m$ ($u_k \neq u_m$) by using the effective SNR values in the SNR inference matrix $SNR_{inf}$. In some embodiments, the AP may calculate the channel capacity $C(u_k, u_m)$ according to Equation 16.

$$C(u_k, u_m) = \log_2\left(1 + SNR_{inf,u_k u_m}\right) + \log_2\left(1 + SNR_{inf,u_m u_k}\right) \quad \text{Equation 16}$$

In Equation 16, $SNR_{inf,u_k u_m}$ is the element of $u_k$-th row and $u_m$-th column for $SNR_{inf}$ matrix.

At 1607, the AP may, for $u_k$, select a user $u_m$ with the best channel capacity with $u_k$ among the elements in the incomplete group set $\psi$.

At 1608, the AP may find the selected user index $u_m$ as the element in the group $G_k=\{u_k, u_m\}$ and update the incomplete group set $\psi$ as $\psi=G_k'$ where $u_m$ is the user index with the highest channel capacity combined with $u_k$.

At 1609, the AP may check whether the dimension of $G_k$ is equal to the number of streams, $N_{ss}$. The AP may go to the operation 1613 if the dimension of $G_k$ equals to the number of streams, $N_{ss}$. Otherwise, the AP may go to the operation 1611, set the current user $u_k$ equal to $u_m$, and go back to operation 1605.

At 1613, the AP may check whether $u_k$ is equal to $u_K$. If $u_k$ is equals to $u_K$, the AP may go to the operation 1617. Otherwise, the AP may go to the operation 1615, set the current user $u_k$ equal to $u_{k+1}$, and go back to the operation 1603.

At 1617, the AP may finish the Greedy search algorithm, perform the final MU-MIMO user selection, and select a group with the best channel capacity among groups in the group set $\mathbb{G}=\{G_1, G_2, \ldots, G_K\}$.

At 1619, the AP may select users in the selected group with the best channel capacity as the MU-MIMO users and determine MCS levels for the MU-MIMO users to output station identifiers (STA-IDs) and MCS levels of the MU-MIMO users.

Figure 17:
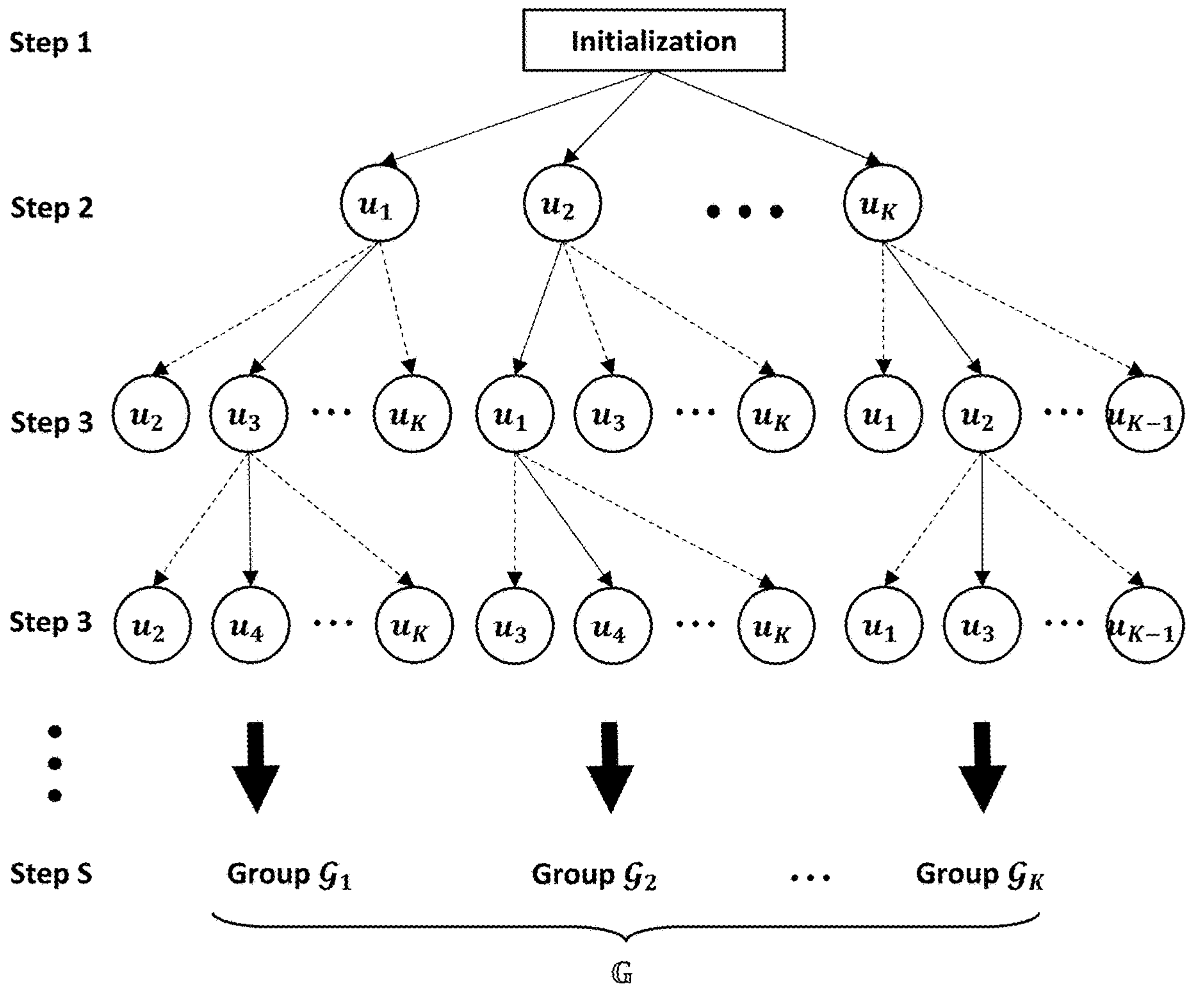
FIG. 17 illustrates an exemplary MU selection with Greedy Search algorithm in accordance with an embodiment.

FIG. 17 illustrates an exemplary MU selection with Greedy Search algorithm in accordance with an embodiment.

At Step 1, the AP may set the current user $u_k$ equal to $u_1$.

At Step 2, the AP may generate the group set $G_k$ with the element $u_k$, $G_k=\{u_k\}$ and generate the incomplete group set $\psi=G_k'$, where $G_k'$ is a set of all users except those included in $G_k$.

At Step 3, the AP may calculate the channel capacity $C(u_k, u_m)$ between $u_k$ and $u_m$ ($u_k \neq u_m$) by using the effective SNR values in the SNR inference matrix $SNR_{inf}$. In some embodiments, the AP may calculate the channel capacity $C(u_k, u_m)$ according to Equation 16. The AP may, for $u_k$, select a user $u_{m1}$ with the best channel capacity with $u_k$ among the elements in the incomplete group set $\psi$. The AP may find the selected user index $u_{m1}$ as the element in the group $G_k=\{u_k, u_{m_1}\}$ and update the incomplete group set $\psi$ as $\psi=G_k'$ where $u_{m_1}$ is the user index with the highest channel capacity combined with $u_k$.

The AP may set the current user $u_k$ equal to $u_m$ and repeat Step 3 until the dimension of $G_k$ is equal to the number of streams, $N_{ss}$.

If the dimension of $G_k$ is equal to the number of streams, $N_{ss}$, the AP set the current user $u_k$ equal to $u_{k+1}$ and repeat Step 2 and Step 3 until $u_k$ is equals to $u_K$.

At Step S, the AP may finish the Greedy search algorithm, perform the final MU-MIMO user selection, and select a group with the best channel capacity among groups in the group set $\mathbb{G}=\{G_1, G_2, \ldots, G_K\}$. The AP may select users in the selected group with the best channel capacity as the MU-MIMO users and determine final MCS levels for the MU-MIMO users to output station identifiers (STA-IDs) and MCS levels of the MU-MIMO users. For example, when a group $G_k=\{u_{i1}, u_{i2}, u_{i3}\}$ is selected, the AP may determine $MCS_{u_{i1}u_{i2}}$, as a MCS for a user $u_{i1}$, determine a minimum of $MCS_{u_{i1}u_{i2}}$; and $MCS_{u_{i2}u_{i3}}$ as a MCS for a user $u_{i2}$, and determine $MCS_{u_{i3}u_{i2}}$ as a MCS for a user $u_{i3}$.

And then, the AP STA may determine a plurality of steering Q matrices. Each of the plurality of steering matrices is associated with a respective one of the users of the selected group. The AP STA may transmit a MU PPDU in MU-MIMO for the users of the selected group. The final MCS levels and the plurality of steering matrices may be applied to the MU PPDU.

The various illustrative blocks, units, modules, components, methods, operations, instructions, items, and algorithms may be implemented or performed with a processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A wireless communication device for facilitating wireless communication, comprising processing circuitry configured to cause:

transmitting a training frame;

receiving a plurality of feedback frames from a plurality of stations in response to the training frame, wherein each of the plurality of feedback frames is associated with a respective one of the plurality of stations and includes channel quality information for an associated station;

determining a plurality of groups based on the channel quality information in the plurality of feedback frames, wherein each of the plurality of groups is associated with a respective one of the plurality of stations and includes an associated station as a primary station and at least one secondary station;

determining channel capacities of the plurality of groups;

selecting a group of the plurality of groups based on the channel capacities of the plurality of groups;

determining users of the selected group as MU-MIMO users; and transmitting a MU PPDU in MU-MIMO for the users of the selected group, wherein determining the plurality of groups comprises:

determining initial effective SNR values for the plurality of modulation schemes based on the channel quality information in the plurality of feedback frames, wherein each of the initial effective SNR values is for a modulation scheme of a station considering interference from another station of the plurality of stations, determining recommended modulation and coding scheme (MCS) values and final effective SNR values for the recommended MCS values based on the initial effective SNR values, wherein each of the recommended MCS values is recommended for a station considering interference from another station of the plurality of stations, each of the final effective SNR values is associated with a respective one of the recommended MCS values and an effective SNR for an associated recommended MCS value of a station considering interference from another station of the plurality of stations, determining channel capacities of the plurality of groups based on the final effective SNR values, and determining a plurality of groups based on the channel capacities of the plurality of groups, wherein determining the initial effective SNR values for the plurality of modulation schemes comprises:

determining average RBIR values for the plurality of modulation schemes based on the channel quality information in the plurality of feedback frames, and determining the initial effective SNR values for the plurality of modulation schemes based on the average RBIR values.

2. The wireless communication device of claim 1, wherein the at least one secondary station is determined to be included in a group based on channel capacity between a previous station in a group and the at least one secondary station, and the channel capacity between a previous station in a group and the at least one secondary station is determined based on the final effective SNR values.

3. The wireless communication device of claim 1, wherein determining average RBIR values for the plurality of modulation schemes based on the channel quality information in the plurality of feedback frames comprises:

determining signal-to-interference-plus-noise ratio (SINR) values based on the channel quality information in the plurality of feedback frames, wherein each of the SINR values is a SINR for a subcarrier of a station considering interference from another station of the plurality of stations;

determining received bit information rate (RBIR) values for a plurality of subcarriers, a plurality of OFDM symbols, a plurality of spatial streams, and a plurality of modulation schemes based on the SINR values; and determining average RBIR values for the plurality of modulation schemes based on the determined RBIR values.

4. The wireless communication device of claim 3, wherein each of the plurality of feedback frames includes an average signal-to-noise ratio (SNR), a plurality of delta SNRs, and a plurality of V matrices for an associated station, each of the plurality of delta SNRs is associated with a respective one of a plurality of subcarriers and is a difference between a SNR for an associated subcarrier and the average SNR, and each of the plurality of V matrices is associated with a respective one of a plurality of subcarriers, wherein determining the signal-to-interference-plus-noise ratio (SINR) values based on the channel quality information in the plurality of feedback frames comprises:

calculating SNR values for a plurality of subcarriers and for the plurality of stations based on the plurality of delta SNRs and the average signal-to-noise ratio (SNR) in the plurality of the feedback frames;

determining channel correlations based on the plurality of V matrices, wherein each of the channel correlations is between a station of the plurality of stations and another station of the plurality of stations; and determining signal-to-interference-plus-noise ratio (SINR) values based on the calculated SNR values and the channel correlations.

5. The wireless communication device of claim 3, wherein determining the received bit information rate (RBIR) values comprises:

determining the received bit information rate (RBIR) values for a plurality of subcarriers, a plurality of OFDM symbols, a plurality of spatial streams, and a plurality of modulation schemes based on the SINR values by using a look-up table between SINR values and RBIR values.

6. The wireless communication device of claim 1, wherein determining the initial effective SNR values for the plurality of modulation schemes comprises:

determining the initial effective SNR values for the plurality of modulation schemes based on the average RBIR values by using a look-up table between RBIR values and SINR values.

7. The wireless communication device of claim 1, wherein determining the plurality of groups further comprises:

determining required SNR values for the plurality of modulation schemes, and wherein the recommended modulation and coding scheme (MCS) values and the final effective SNR values for the recommended MCS values are determined based on the initial effective SNR values and the required SNR values.

8. The wireless communication device of claim 1, wherein transmitting the training frame comprises:

transmitting a null data packet announcement frame; and transmitting a null data packet as the training frame a short interframe space (SIFS) after the null data packet announcement frame.

9. The wireless communication device of claim 1, wherein the processing circuitry is further configured to cause:

determining final MCS levels for the MU-MIMO users based on the recommended MCS values, wherein the final MCS levels are applied to the MU PPDU.

10. The wireless communication device of claim 1, wherein the processing circuitry is further configured to cause:

determining a plurality of steering matrices, wherein each of the plurality of steering matrices is associated with a respective one of the users of the selected group, wherein the plurality of steering matrices are applied to the MU PPDU.

11. A wireless communication method for facilitating wireless communication, comprising:

transmitting a training frame;

receiving a plurality of feedback frames from a plurality of stations in response to the training frame, wherein each of the plurality of feedback frames is associated with a respective one of the plurality of stations and includes channel quality information for an associated station;

determining a plurality of groups based on the channel quality information in the plurality of feedback frames, wherein each of the plurality of groups is associated with a respective one of the plurality of stations and includes an associated station as a primary station and at least one secondary station;

determining channel capacities of the plurality of groups;

selecting a group of the plurality of groups based on the channel capacities of the plurality of groups;

determining users of the selected group as MU-MIMO users; and transmitting a MU PPDU in MU-MIMO for the users of the selected group, wherein determining the plurality of groups comprises:

determining initial effective SNR values for the plurality of modulation schemes based on the channel quality information in the plurality of feedback frames, wherein each of the initial effective SNR values is for a modulation scheme of a station considering interference from another station of the plurality of stations, determining recommended modulation and coding scheme (MCS) values and final effective SNR values for the recommended MCS values based on the initial effective SNR values, wherein each of the recommended MCS values is recommended for a station considering interference from another station of the plurality of stations, each of the final effective SNR values is associated with a respective one of the recommended MCS values and an effective SNR for an associated recommended MCS value of a station considering interference from another station of the plurality of stations, determining channel capacities of the plurality of groups based on the final effective SNR values, and determining a plurality of groups based on the channel capacities of the plurality of groups, wherein determining the initial effective SNR values for the plurality of modulation schemes comprises:

determining average RBIR values for the plurality of modulation schemes based on the channel quality information in the plurality of feedback frames, and determining the initial effective SNR values for the plurality of modulation schemes based on the average RBIR values.

12. The wireless communication method of claim 11, wherein the at least one secondary station is determined to be included in a group based on channel capacity between a previous station in a group and the at least one secondary station, and the channel capacity between a previous station in a group and the at least one secondary station is determined based on the final effective SNR values.

13. The wireless communication method of claim 11, wherein determining average RBIR values for the plurality of modulation schemes based on the channel quality information in the plurality of feedback frames comprises:

determining signal-to-interference-plus-noise ratio (SINR) values based on the channel quality information in the plurality of feedback frames, wherein each of the SINR values is a SINR for a subcarrier of a station considering interference from another station of the plurality of stations;

determining received bit information rate (RBIR) values for a plurality of subcarriers, a plurality of OFDM symbols, a plurality of spatial streams, and a plurality of modulation schemes based on the SINR values; and determining average RBIR values for the plurality of modulation schemes based on the determined RBIR values.

14. The wireless communication method of claim 13, wherein each of the plurality of feedback frames includes an average signal-to-noise ratio (SNR), a plurality of delta SNRs, and a plurality of V matrices for an associated station, each of the plurality of delta SNRs is associated with a respective one of a plurality of subcarriers and is a difference between a SNR for an associated subcarrier and the average SNR, and each of the plurality of V matrices is associated with a respective one of a plurality of subcarriers, wherein determining the signal-to-interference-plus-noise ratio (SINR) values based on the channel quality information in the plurality of feedback frames comprises:

calculating SNR values for a plurality of subcarriers and for the plurality of stations based on the plurality of delta SNRs and the average signal-to-noise ratio (SNR) in the plurality of the feedback frames;

determining channel correlations based on the plurality of V matrices, wherein each of the channel correlations is between a station of the plurality of stations and another station of the plurality of stations; and determining signal-to-interference-plus-noise ratio (SINR) values based on the calculated SNR values and the channel correlations.

15. The wireless communication method of claim 13, wherein determining the received bit information rate (RBIR) values comprises:

determining the received bit information rate (RBIR) values for a plurality of subcarriers, a plurality of OFDM symbols, a plurality of spatial streams, and a plurality of modulation schemes based on the SINR values by using a look-up table between SINR values and RBIR values.

16. The wireless communication method of claim 11, wherein determining the initial effective SNR values for the plurality of modulation schemes comprises:

determining the initial effective SNR values for the plurality of modulation schemes based on the average RBIR values by using a look-up table between RBIR values and SINR values.

* * * * *